(12) United States Patent
Qian et al.

(10) Patent No.: US 8,358,866 B2
(45) Date of Patent: Jan. 22, 2013

(54) METHOD AND SYSTEM FOR INCREASING SIGNAL-TO-NOISE RATIO

(75) Inventors: Shen-En Qian, Brossard (CA); Hisham Othman, Longueuil (CA)

(73) Assignee: Canadian Space Agency, St-Hubert, Quebec (CA)

(*) Notice: Subject to any disclaimer, the term of this patent is extended or adjusted under 35 U.S.C. 154(b) by 504 days.

(21) Appl. No.: 12/223,283

(22) PCT Filed: Jan. 29, 2007

(86) PCT No.: PCT/CA2007/000114
§ 371 (c)(1),
(2), (4) Date: Jul. 2, 2010

(87) PCT Pub. No.: WO2007/087702
PCT Pub. Date: Aug. 9, 2007

(65) Prior Publication Data
US 2011/0170796 A1    Jul. 14, 2011

Related U.S. Application Data

(60) Provisional application No. 60/763,381, filed on Jan. 31, 2006.

(51) Int. Cl.
*G06K 9/40* (2006.01)

(52) U.S. Cl. ........ 382/260; 382/154; 382/274; 382/275; 358/3.26; 358/3.27; 358/463

(58) Field of Classification Search .......... 382/154, 382/260, 274, 275; 358/3.26, 3.27, 463
See application file for complete search history.

(56) References Cited

U.S. PATENT DOCUMENTS

| | | | |
|---|---|---|---|
| 6,633,683 B1 | 10/2003 | Dinh et al. | |
| 6,741,739 B1 | 5/2004 | Vincent | |
| 6,819,790 B2 * | 11/2004 | Suzuki et al. | 382/156 |

(Continued)

FOREIGN PATENT DOCUMENTS

CA    2640683    8/2007

(Continued)

OTHER PUBLICATIONS

Basuhail, A. et al., "Wavelet-based noise reduction in multispectral imagery," SPIE Conf Algorithms for Multispectral and HyperspectralImagery IV, Orlando, vol. 3372, pp. 234-240, 1998.

(Continued)

*Primary Examiner* — Yosef Kassa
(74) *Attorney, Agent, or Firm* — Brion Raffoul

(57) ABSTRACT

Methods and systems for increasing the signal-to-noise ratio for satellite sensor data or signals, such as hyperspectral imageries (also referred to as datacubes due to their 3-dimensional nature). This is done by reducing the noise in the data or signals by first elevating the noise level temporarily for effective denoising. The denoising process is then performed in this condition and the noise level is then reversibly de-elevated after denoising. The denoising process comprises noise removal in both the spectral and the spatial domains. Once the denoising process is complete, the data is converted back from the spectral and spatial domains. Since this reconstruction process introduces errors, these errors are compensated for using the components from both the original data and denoised data filtered by the low pass filters.

20 Claims, 12 Drawing Sheets

U.S. PATENT DOCUMENTS

| | | | |
|---|---|---|---|
| 6,892,089 B1* | 5/2005 | Prince et al. | 600/410 |
| 7,337,070 B2* | 2/2008 | Lecerf | 702/17 |
| 7,876,820 B2* | 1/2011 | Auwera et al. | 375/240.11 |
| 8,149,336 B2* | 4/2012 | Mohanty et al. | 348/607 |
| 2004/0008904 A1 | 1/2004 | Lin et al. | |
| 2004/0064307 A1 | 4/2004 | Scalart | |
| 2005/0068430 A1 | 3/2005 | Yano et al. | |
| 2005/0248687 A1 | 11/2005 | Lee et al. | |
| 2011/0170796 A1 | 7/2011 | Qian | |

FOREIGN PATENT DOCUMENTS

| | | |
|---|---|---|
| EP | 1982305 | 6/2011 |
| WO | 03107659 | 12/2003 |
| WO | 2007087702 | 8/2007 |

OTHER PUBLICATIONS

Bruce, A.G. et al., "Understanding waveshrink: variance and bias estimation," Biometrika, vol. 83, pp. 727-745, 1996.

Bui, T. D. et al., "Translation-invariant denoising using Multiwavelets," IEEE Trans. Signal Processing, vol. 64, No. 12, pp. 3414-3420, 1998.

Bukingham, R., et al., "Review of Canadian Airborne and Space Activities in Hyperspectral Remote Sensing," Canadian Aeronautics and Space Journal, vol. 48, No. 1, pp. 115-121, 2002.

Chang, S.G., "Adaptive Wavelet Thresholding for Image Denoising and Compression", IEEE Transactions on Image Processing, vol. 9, No. 9, Sep. 2000.

Choi, H, et al., "Multiple wavelet basis image 30 denoising using Besov ball projections," IEEE Signal Processing Letters, vol. 11, issue 9, pp. 717-720, Sep. 2004.

Donoho, D.L., et al., "Threshold selection for wavelet shrinkage of noisy data," Proc. IEEE Inte'l Conf Engineering in Medicine and Biology Society, Engineering Advances: New Opportunities for Biomedical Engineers, vol. 1, pp. A24-A25, Nov. 1994.

Donoho, D.L., et al., "Ideal spatial adaptation via wavelets shrinkage," Biometrika, vol. 81, pp. 425-455, 1994a.

Donoho, D.L., et al., "Adapting to unknown smoothness via wavelets shrinkage," J. American Statistics Association, 90(432), pp. 1200-1224, 1995.

European Office Action on 1982305 dated Jul. 2, 2010.

European Search Report on 1982305 dated Mar. 31, 2010.

European Supplementary Search Report on 1982305 dated Mar. 31, 2010.

European Communication on 1982305 dated Apr. 19, 2010.

Gyaourova, A. et al., "Undecimated wavelet transforms for image de-noising," Lawrence Livermore National Laboratory, Livermore, California, Technical report, UCRL-ID-150931, Nov. 19, 2002.

International Preliminary Report on Patentability on PCT/CA2007/000114 dated Aug. 5, 2008.

Lang, M., et al., "Non-linear processing of a shift-invariant DWT for noise reduction," SPIE, Mathematical Imaging: Wavelet Applications for Dual Use, on SPIE Symp. on DE/Aerospace Sensing and Dual Use Photonics, Orlando, Florida, Apr. 17-21, 1995.

Lang, M., et al., "Noise reduction using an undecimated discrete wavelet transform," IEEE Signal Processing Letters, vol. 3, issue 1, pp. 10-12, Jan. 1996.

MacDonald Dettwiller, "System studies of a small satellite hyperspectral mission, data acceptability", Contract Technical Report to Canadian Space Agency, St-Hubert, Canada, HY-TN-51-4972, issue 2/1, Mar. 5, 2004.

Othman, H., et al., "Noise Reduction of Hyperspectral Imagery Using Hybrid Spatial-Spectral Derivative-Domain Wavelet Shrinkage," IEEE Trans. on Geoscience and Remote Sensing, vol. 44, No. 1, pp. 397-408, Feb. 2006.

Pizurica, A., et al., "Wavelet domain denoising of single-band and multiband images adapted to the probability of the presence of features of interest," SPIE Conference Wavelets XI, San Diego, California, USA, Jul. 31-Aug. 4, 2005.

Pizurica, A., et al., "Estimating the probability of the presence of a signal of interest in multiresolution single- and multiband image denoising," IEEE Trans. Image Processing (in press), http://telin.ugent.be/-sanja/ Papersrrrans IP2005 ProbShrink.pdf.

Qian, S-E, et al., "Near lossless data compression onboard a hyperspectral satellite," IEEE Trans. Aerospace and Electronic Systems, vol. 42, No. 3, pp. 851-866, Jul. 2006.

Scheunders, P. et al., "Least-squares interband denoising of color and multispectral images," Int'l Cont. on Image Processing, pp. 985-988, Oct. 2004.

Scheunders, P., "Wavelet thresholding of multivalued images," IEEE Trans. Image Processing, vol. 13(4), pp. 475-483, Apr. 2004a.

Schmidt, K.S., et al., "Smoothing vegetation Spectra with Wavelets," Int. J. Remote Sensing, vol. 25, No. 6, pp. 1167-1184, Mar. 2004.

Wallace M. Peter, et al., "A system overview of the Airborne Visible/Infrared Imaging Spectrometer (AVIRIS)," SPIE, vol. 834 Image Spectroscopy II, pp. 22-30, 1987.

Othman, Hisham et al., "Novel Aβ-Binding Protein and its Peptide Derivatives and Uses Thereof", Canadian Journal of Remote Sensing, vol. 34, Suppl. 1, pp. S59-S67, 2008.

* cited by examiner (a) Datacube dimensions (b) AVIRIS Greater Victoria Watershed District datacube.

(c) Cuprite Simulated datacube.

METHOD AND SYSTEM FOR INCREASING SIGNAL-TO-NOISE RATIO

CROSS REFERENCE TO RELATED APPLICATIONS

This application claims the benefit of priority of U.S. Provisional Patent Application No. 60/763,381 filed Jan. 31, 2006 which is hereby incorporated by reference.

FIELD OF THE INVENTION

The present invention relates to signal and data processing. More specifically, the present invention relates to methods and systems for improving the signal-to-noise ratio for multidimensional data, such as datacubes, by reducing noise in the data.

BACKGROUND TO THE INVENTION

For ease of reference, the following documents are referred to by the following reference numbers in this document.
[1] P. Scheunders and J. Driesen, "Least-squares interband denoising of color and multispectral images," *Int'l Conf. on Image Processing*, pp. 985-988, October 2004.
[2] Aleksandra Pizurica, Wilfried Philips and Paul Scheundersy, "Wavelet domain denoising of single-band and multiband images adapted to the probability of the presence of features of interest," *SPIE Conference Wavelets XI*, San Diego, Calif., USA, 31 Jul.-4 Aug. 2005.
[3] Aleksandra Pizurica and Wilfried Philips, "Estimating the probability of the presence of a signal of interest in multiresolution single- and multiband image denoising," *IEEE Trans. Image Processing* (in press), http://telin.ugent.be/~sanja/Papers/TransIP2005_ProbShrink.pdf
[4] P. Scheunders, "Wavelet thresholding of multivalued images," *IEEE Trans. Image Processing*, vol. 13(4), pp. 475-483, April 2004.
[5] Hyeokho Choi and R. G. Baraniuk, "Multiple wavelet basis image denoising using Besov ball projections," *IEEE Signal Processing Letters*, vol. 11, issue 9, pp. 717-720, September 2004.
[6] D. L. Donoho and I. M. Johnstone, "Threshold selection for wavelet shrinkage of noisy data," *Proc. IEEE Inte'l Conf Engineering in Medicine and Biology Society*, Engineering Advances: New Opportunities for Biomedical Engineers, vol. 1, pp. A24—A25, November 1994.
[7] K. S. Schmidt and A. K. Skidmore, "Smoothing vegetation Spectra with Wavelets," *Int. J. Remote Sensing*, vol. 25, No. 6, pp. 1167-1184, March, 2004.
[8] M. Lang, H. Guo, J. E. Odegard, C. S. Burrus and R. O. Wells, "Non-linear processing of a shift-invariant DWT for noise reduction," *SPIE, Mathematical Imaging Wavelet Applications for Dual Use, on SPIE Symp. On OE/Aerospace Sensing and Dual Use Photonics*, Orlando, Fla., 17-21 Apr. 1995.
[9] M. Lang, H. Guo, J. E. Odegard, C. S. Burrus and R. O. Wells Jr., "Noise reduction using an undecimated discrete wavelet transform," *IEEE Signal Processing Letters*, vol. 3, issue 1, pp. 10-12, January 1996.
[10] T. D. Bui and G. Y. Chen, "Translation-invariant denoising using Multiwavelets," *IEEE Trans. Signal Processing*, vol. 64, no. 12, pp. 3414-3420, 1998.
[11] Aglika Gyaourova, C. Kamath, and I. K. Fodor, "Undecimated wavelet transforms for image de-noising," Lawrence Livermore National Laboratory, Livermore, Calif., Technical report, UCRL-ID-150931, Nov. 19, 2002.
[12] D. L. Donoho and I. M. Johnstone, "Ideal spatial adaptation via wavelets shrinkage," *Biometrika*, vol. 81, pp. 425-455, 1994.
[13] D. L. Donoho and I. M. Johnstone, "Adapting to unknown smoothness via wavelets shrinkage," *J. American Statistics Association*, 90(432), pp. 1200-1224, 1995.
[14] S Grace Chang, Bin Yu and Martin Vetterli, "Adaptive wavelet thresholding for image denoising and compression," *IEEE Transactions on Image Processing*, vol. 9, no. 9, pp. 1532-1546, September 2000.
[15] A. G. Bruce and H. Y. Gao, "Understanding waveshrink: variance and bias estimation," *Biometrika*, vol. 83, pp. 727-745, 1996.
[16] Wallace M. Poter and Harry T. Enmark, "A system overview of the Airborne Visible/Infrared Imaging Spectrometer (AVIRIS)," *SPIE, vol. 834 Image Spectroscopy II*, pp. 22-30, 1987.
[17] MacDonald Dettwiller, "System studies of a small satellite hyperspectral mission, data acceptability", Contract Technical Report to Canadian Space Agency, St-Hubert, Canada, HY-TN-51-4972, issue 2/1, Mar. 5, 2004.
[18] Shen-En Qian, Martin Bergeron, Ian Cunningham, Luc Gagnon and Allan Hollinger, "Near lossless data compression onboard a hyperspectral satellite," *IEEE Trans. Aerospace and Electronic Systems*, vol. 42, no. 3, pp. 851-866, July 2006.
[19] R. Bukingham, K. Staenz and A. B. Hollinger, "Review of Canadian Airborne and Space Activities in Hyperspectral Remote Sensing," *Canadian Aeronautics and Space Journal*, vol. 48, no. 1, pp. 115-121, 2002.
[20] A. Basuhail, S. P. Kozaitis, "Wavelet-based noise reduction in multispectral imagery," *SPIE Conf. Algorithms for Multispectral and Hyperspectral Imagery IV*, Orlando, vol. 3372, pp. 234-240, 1998.
[21] C. Sidney Burrus, Ramesh A Gopinath and Haitao Guo, "Introduction to Wavelets and Wavelet Transforms, A primer," Prentice Hall, 1998, pp. 88-97.
[22] Hisham Othman and Shen-En Qian, "Noise Reduction of Hyperspectral Imagery Using Hybrid Spatial-Spectral Derivative-Domain Wavelet Shrinkage," *IEEE Trans. on Geoscience and Remote Sensing*, vol. 44, no. 1, pp. 397-408, February, 2006.

Satellite imagery has been used in the past for purposes as disparate as military surveillance and vegetation mapping. However, regardless of the purpose behind satellite imagery, higher quality images have always been desirable.

The reliability of the information delivered by hyperspectral remote sensing sensors (or imagers) highly depends on the quality of the captured data. Despite the advance in hyperspectral sensors, captured data carry enough noise to affect the information extraction and scene interpretation. This noise includes a signal dependent component, called photon noise, and other signal independent components, e.g. thermal noise.

A key parameter in the design of a hyperspectral imager is its Signal-to-Noise Ratio (SNR), which determines the capabilities and the cost of the imager. A sufficiently high SNR can be achieved first-hand by adopting some excessive measures in the instrument design, e.g. increasing the size of the optical system, increasing the integration time, increasing the detector area, etc. Normally, these are prohibitively expensive solutions, especially in the case of spaceborne instruments. Alternatively, modern numerical processing based Noise Reduction (NR) methods provide a cost-effective solution that is becoming more and more affordable (in terms of speed and expense) due to the availability of the advanced computing devices.

Smoothing filters and Minimum Noise Fraction (MNF) are the most popular among the legacy methods of hyperspectral/multispectral imagery NR. While smoothing filters have a negative impact on the sharp signal features, the MNF is relatively demanding in terms of computational expenses.

Several methods have been introduced recently which benefit from compactness of the wavelet transform. Examples of the recent wavelet transform-based NR methods include the Linear Minimal Mean Squared Error (LMMSE) method in [1], featuring a global and two local estimators. Although the local estimators outperform the global estimator in the color images, they suffer from what is perceived in that paper as "low correlation between the textures in different bands" in multispectral images.

Another wavelet-transform-based NR methods is introduced in [2] based on the probability of the presence of features of interest [3], where denoising is carried out band-by-band taking into account the inter-band correlation. It is found that this method is performing well if the noise statistics are the same in all bands and is less suitable in the case where noise statistics varies from band to band. The inter-band correlation is also used in [4] to differentiate between the noise coefficients and the signal coefficients, which performs well in additive noise conditions.

Most of the hyperspectral/multispectral imagery NR methods perform well in fixed-variance additive noise environments. Unfortunately, real-life scenarios necessitate the existence of a signal-dependent noise component. In fact, at high SNR, the signal-dependent component becomes even more significant than the fixed-variance component because it is proportional to the signal amplitude.

In fact, the hyperspectral signal may vary dramatically from band to band with variable smoothness in different spectral regions, e.g. smoothness in the Visible and Near Infrared (VNIR) region compared to the smoothness in the Short-Wave Infrared (SWIR) region.

These and other considerations show that there is a need for better methods to increase SNR for such data and the signals derived from such data. Ideally, such methods would increase the SNR by reducing noise in the data or in the signal derived from such data.

SUMMARY OF THE INVENTION

The present invention relates to methods and systems for increasing the signal-to-noise ratio for satellite sensor data or signals, such as hyperspectral imageries (also referred to as datacubes due to their 3-dimentioanal nature). This is done by reducing the noise in the data or signals by first elevating the noise level temporarily for effective denoising. The denoising process is then performed in this condition and the noise level is then reversibly de-elevated after denoising. The denoising process comprises noise removal in both the spectral and the spatial domains. Once the denoising process is complete, the data is converted back from the spectral and spatial domains. Since this reconstruction process introduces errors, these errors are compensated for using the components from both the original data and denoised data filtered by the low pass filters.

In one embodiment, the present invention provides a method for improving the signal to noise ratio of data of a multidimensional datacube, said data being in an original domain, the method comprising the steps of:
a) elevating the noise level of said data
b) removing noise from said data in a spatial domain
c) removing noise from said data in a spectral domain to result in denoised data
d) converting denoised data into said original domain
e) correcting errors introduced to said data by step d).

In another embodiment, the present invention provides a system for reducing the signal to noise ratio of multidimensional data, said data being in an original domain, the system comprising:
means for elevating the noise level of said data
means for removing noise from said data in at least one domain to result in denoised data
means for converting denoised data into said original domain
means for correcting errors introduced to said data by a conversion of said denoised data.

BRIEF DESCRIPTION OF THE FIGURES

A better understanding of the invention will be obtained by considering the detailed description below, with reference to the following drawings in which.

DETAILED DESCRIPTION

Wavelet Shrinkage Noise Reduction

Figure 1:
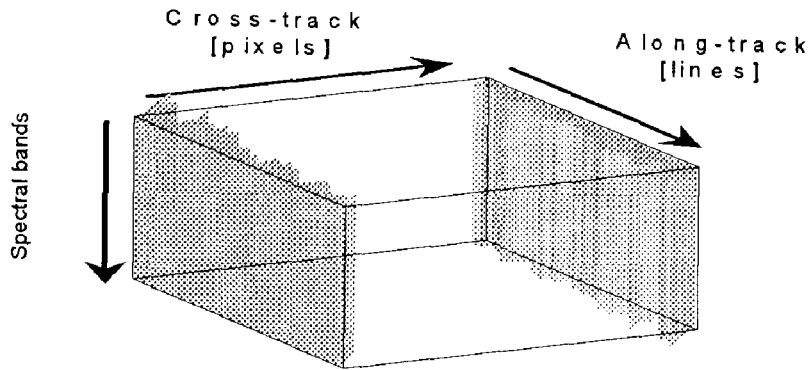
FIG. 1 illustrates a datacube as well as the sample datacubes mentioned in this document.
Figure 1:
Figure 1:

Wavelet Shrinkage (WS) NR methods benefit from the fact that wavelet transform provides a sparse representation for a wide class of signals, especially those that are piece-wise smooth and of coherent regularity. In other words, transforming the signal to the wavelet domain results in a large number of coefficients with small (or zero) values and a small number of coefficients with large values. In contrast, transforming the noise to the wavelet domain produces sort of a scattered distribution of the noise energies over all scales and translations, assuming that the noise is white.

Using the principle of superposition, the transformation of a piece-wise smooth signal corrupted with a white noise produces a blend of a few coefficients with large amplitudes (signal-related) and a large number of coefficients with small amplitudes (noise-related). Note that all coefficients carry noise contribution.

Removing the small coefficients and shrinking the large coefficients eliminate most of the noise contribution to the signal in the wavelet domain. This process is referred to as soft threshold [6]. Then, an inverse wavelet transform is applied to obtain the denoised signal. The term "denoising" and "noise reduction" will be interchangeably used in this document, ignoring the fact that a noisy signal cannot be completely denoised in real-life.

Let y be the noisy signal that is composed of the pure signal x and noise v.

$$y = x + v \quad (1)$$

The wavelet shrinkage process can be outlined as follows:

$$d = DWT\{y\} \quad (2)$$

$$\hat{d} = \eta_\tau(d) \quad (3)$$

$$\hat{x} = IDWT\{\hat{d}\} \quad (4)$$

where DWT{.} and IDWT{.} are the discrete wavelet transform and the inverse discrete wavelet transform, respectively, $d=\{d_i\}$ and $\hat{d}=\{\hat{d}_i\}$ are the wavelet coefficients before and after the shrinkage process, $\eta_\tau()$ is a shrinkage function for a threshold value $\tau$, and $\hat{x}$ is the denoised signal.

In order to avoid confusion, an abstract index, i, is used to address the wavelet coefficient, $d_i$. The actual indices may vary depending on the wavelet transform but in all cases they contain a scale index and a translation index (or more). For example, in the case of 3-D DWT, wavelet coefficients indices include a scale index and three translation indices (one in each dimension of the signal). The baseline decimated DWT is compact but yields a translation-variant signal representation. One alternative is the undecimated or the translation-invariant DWT, whish is shown in the literature to have a better performance in NR[7]-[11].

In the heart of WS noise reduction systems is the problem of determining a threshold below which the coefficients are set to zero and above which the coefficients are shrunk. Several methods were introduced to estimate threshold values that are optimal in different senses, including global thresholds, e.g. the minimax and the universal thresholds [12], and data-driven thresholds, e.g. SURE threshold [13] and BayesShrink threshold [14]. In one aspect of this invention there is implemented a global threshold and two data-driven thresholds, notably, Minimax, SureShrink and BayesShrink, which are outlined below.

Minimax Threshold

This threshold aims to minimizing the upper bound of the risk of the signal deformation and is obtained by finding a threshold value $\tau_{mnmx}$ that fulfills:

$$R_{mnmx} = \inf_\tau \sup_d \left\{ \frac{R_\tau(d)}{n^{-1} + R_{oracle}(d)} \right\} \quad (5)$$

where sup(S) denotes the supremum of a set S, which is the least upper bound of the set, inf(S) denotes the infimum of a set S, which is the greatest lower bound the set, d is a set of wavelet coefficients of the noisy function, n is the sample size, $R_{Oracle}(d)$ is the ideal risk that can be achieved by an oracle (a guide) and $R_\tau(d)$ is the risk of deformation due to the threshold process $\eta_\tau(.)$, which is expressed as:

$$R_\tau(d) = E\{(\eta_\tau(d)-d)^2\} \quad (6)$$

There are two famous oracles found in the literature, namely, the Diagonal Linear Projection (DLP) and the Diagonal Linear Shrinker (DLS) [12],[15]. The DLP provides guidance to identifying the coefficients to be set to zero whereas the DLS guides to the amount of shrinkage that is optimal for a given d. The ideal risks of these two oracles are given by:

$$R_{DLP}(d) = \min(d^2, 1), \quad R_{DLS}(d) = \frac{d^2}{d^2 + 1} \quad (7)$$

SureShrink

SURE (Stein's Unbiased Risk Estimator) Shrink minimizes the Stien unbiased estimate of risk for threshold estimates. It is shown in [13] that SureShrink threshold can be obtained by:

$$\tau_{SURE} = \operatorname*{argmin}_{0 \leq \tau \leq \sqrt{2\log n}} R_{SURE}(\tau, d) \quad (8)$$

where d is a set of wavelet coefficients of the noisy signal, n is the number of wavelet coefficients and $R_{SURE}$ is the SURE risk for a threshold $\tau$, which is given by:

$$R_{SURE}(\tau,d) = n - 2 \cdot \#\{i : |d_i| \leq \tau\} + \Sigma_{i=1}^n [\min(|d_i|,\tau)]^2 \quad (9)$$

where i is an abstract index of a wavelet coefficient and #{S} denotes the number of elements in a set S.

BayesShrink

BayesShrink minimizes the Bayes' risk estimator function assuming a generalized Gaussian prior [14]. Based on which the threshold $\tau_{Bayes}$ is given by:

$$\tau_{Bayes}(\hat{\sigma}_x) = \frac{\hat{\sigma}^2}{\hat{\sigma}_x} \quad (10)$$

where $\hat{\sigma}$ and $\hat{\sigma}_x$ are the estimated standard deviations of the noise and the pure signal, respectively, and are given by:

$$\hat{\sigma} = \frac{\text{Median}(|d_j|)}{0.6745} \quad (11)$$

$$\hat{\sigma}_x = \sqrt{\max(\hat{\sigma}_y^2 - \hat{\sigma}^2, 0)} \quad (12)$$

where $\{d_j\}$ are the wavelet coefficients at the finest scale and $\hat{\sigma}_y$ is the standard deviation of the noisy signal.

Noise Nature of the Multi-Dimensional Data and the Test Datacubes

The hyperspectral datacube structure and two test datacubes tested in this invention is described along with the main differences between the targeted noise environment and the one that is commonly addressed in the image denoising literature.

A datacube is a set of spatially aligned images that are captured by an airborne/spaceborne hyperspectral imager. Each image corresponds to a given spectral band (or wavelength). A datacube consists of two spatial dimensions (along-track and cross-track) and one spectral dimension (wavelength). The term track refers to the direction in which the aircraft/spacecraft that is carrying the imager is traveling. The size of the datacube will be written in the form $\Lambda \times P \times L$, where $\Lambda$ is the number of bands, P is the number of pixels in the cross-track and L is the number of lines in the along-track as depicted in FIG. 1. For example, 204×120×128 is the size of a datacube that consists of 204 spectral bands, 128 lines in the along-track direction and 120 pixels in the cross-track direction.

The test data set consists of two datacubes extracted from hyperspectral datacubes of two different sites; a vegetation-dominated site and a geological site. The first datacube is acquired using an Airborne Visible/Infra-Red Imaging Spectrometer (AVIRIS) [14] in the Greater Victoria Watershed District (GVWD), Canada, on Aug. 12, 2002. The ground sample distance (GSD) of the datacube is 4 m×4 m with nominal AVIRIS SNR of 1000:1. The term nominal SNR refers to the ratio of the signal to the noise in the Visible and Near InfraRed (VNIR) region in a given SNR pattern at certain circumstances [17]. The datacube was processed to at-sensor radiance and 16-bit encoded. A 28 m×28 m GSD datacube was derived by spatially averaging the 4 m×4 m GSD datacube elevating the nominal SNR to 7000:1. Having such high SNR, this datacube is viewed as a pure datacube, i.e. a noise-free datacube [18], and is used as a reference to measure the SNR before and after denoising. The corresponding noisy datacube is developed by MacDonald Dettwiller Associates (MDA) Inc. according to a 600:1 SNR pattern in [17]. The size of the datacube we extracted for testing is 202×120×128.

The second test datacube is of size 210×128×128, extracted from a simulated datacube for Cuprite, Nev., USA, with a nominal SNR of 600:1 obtained from the same source.

The nominal SNR of 600:1 is chosen based on the recommendation of the user and science team of the Hyperspectral Environment and Resource Observer (HERO); a future Canadian hyperspectral satellite[19]. It is believed that a nominal SNR of 600:1 is a reasonable choice from the feasible range of the new instrument. This SNR value is a conclusion of comprehensive discussions and a delicate compromise that involves users requirements and several design parameters, e.g. data quality, cost, weight and technology availability.

Figure 2:
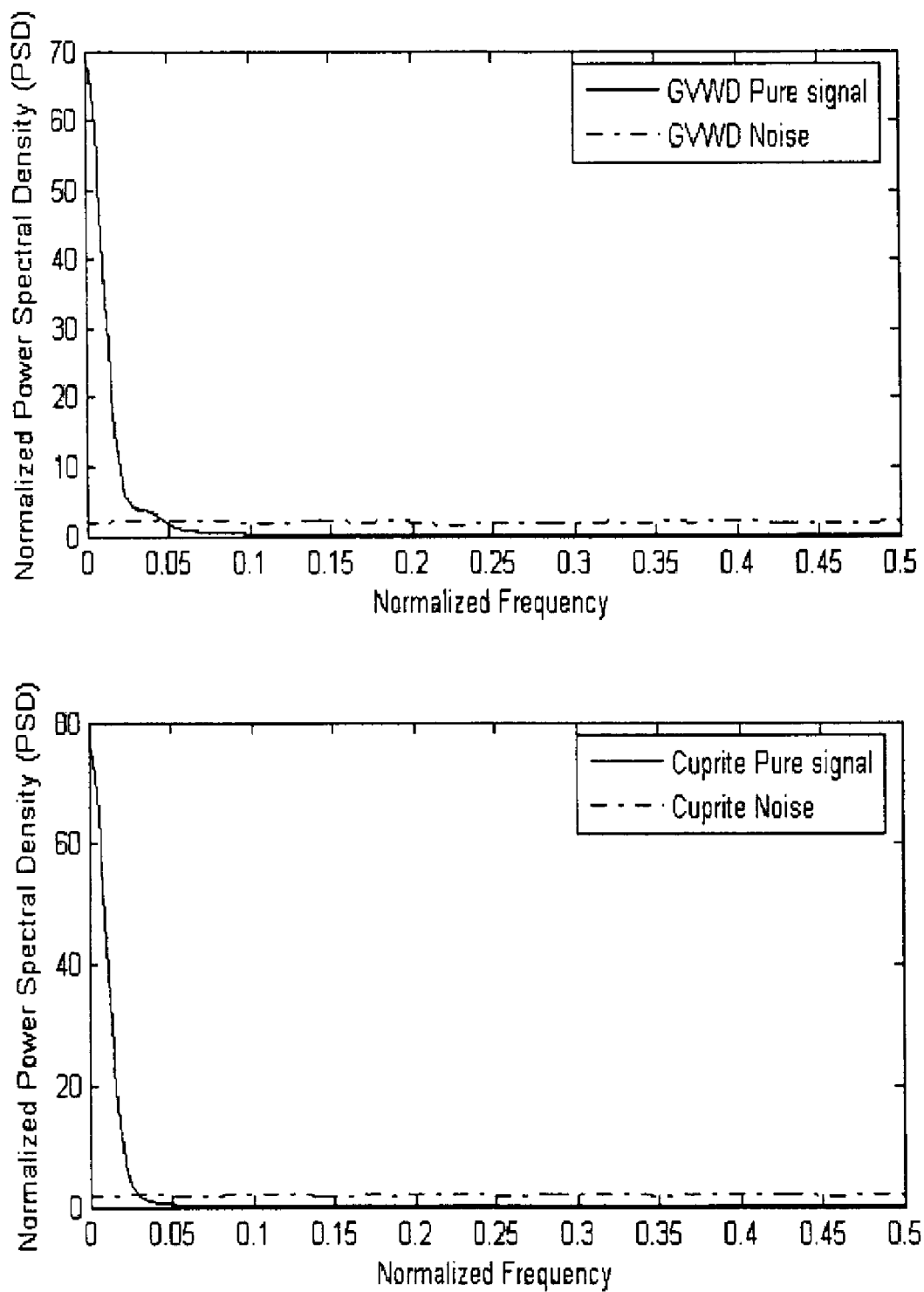
FIG. 2 shows the normalized power spectral density of the datacubes illustrated in FIG. 1.

An objective of this invention is to improve the data quality of hyperspectral imagery through increasing their SNR by noise reduction. The average power of the signal at a given pixel is concentrated at the low frequencies of the Fourier spectrum whereas the noise at a given pixel is white, i.e. uniformly distributed as shown in FIG. 2. This is similar to the noise environment that is normally targeted in the image denoising literature, yet there are two important differences in the noise environment that are targeted:

1—The noise variance is not constant across the signal-domain spectrum (a prefix "signal-domain" is added to distinguish them), i.e. the spectral dimension of a hyperspectral datacube. The noise variance at a given band varies with the signal level at this band following a predetermined SNR pattern[17]. This SNR pattern is related to the characteristics of the instrument. In other words, the noise level of each band image is a function of the instrument SNR pattern and consequently in the signal level at each band. (This is different from the simple stationary additive noise model that is simulated by adding noise with a fixed standard deviation to the datacube.)

2—The average noise level of hyperspectral datacubes used in evaluating the proposed method is much lower than the noise level that is targeted by conventional image noise reduction methods in the literature. Normally one can find values like σ=10, 20 and 30 in the noise reduction literature. For example, the GVWD test datacube has a Peak SNR (PSNR) of 49.8 dB, which is equivalent to adding a stationary noise of standard deviation, σ=0.82 to an 8-bit image. This noise level is not visible for a human eye but may affect remote sensing final products and applications.

Figure 4:
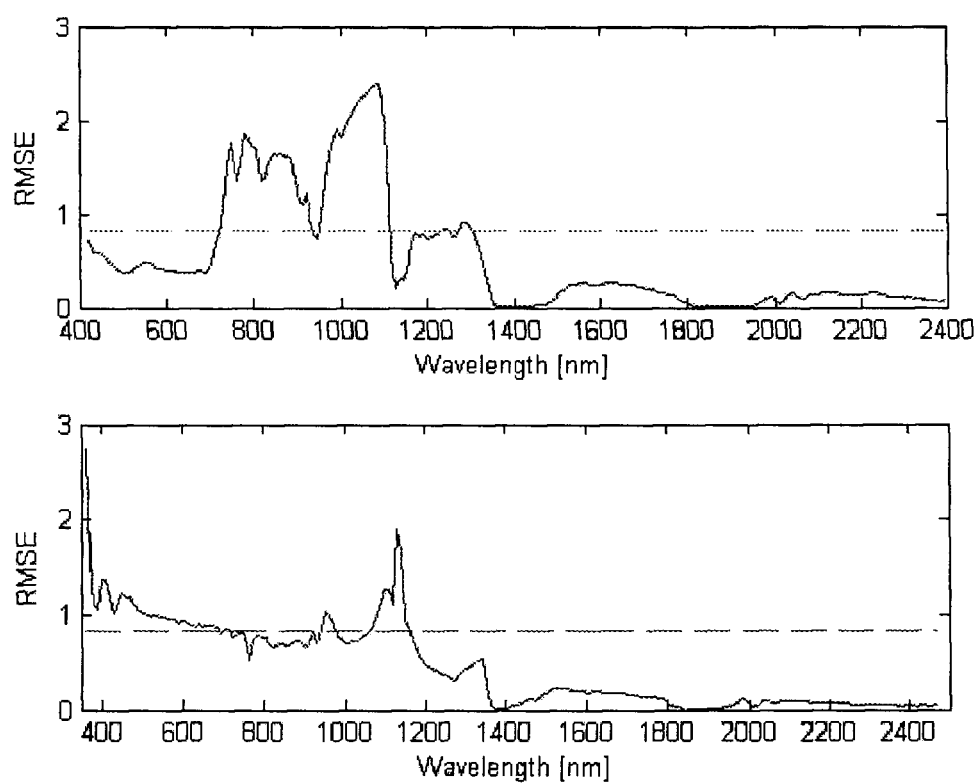
FIG. 4 illustrates the noise level of band images of the two datacubes illustrated in FIG. 1 in terms of Root-Mean-Square-Error.

In order to show the noise of hyperspectral datacubes in a form that is consistent with the form used in 8-bit images, the test datacubes are rescaled to 8-bits (maximum of 255) and the Root-Mean-Square Error (RMSE) per band datacubes is plotted in FIG. 4. FIG. 4 shows the noise level of band images in terms of RMSE of the test datacubes. The top image relates to the GVWD datacube while the bottom image relates to the Cuprite datacube. The dashed lines are the average RMSE.

Hybrid Spatial-Spectral Noise Reduction

Figure 5:
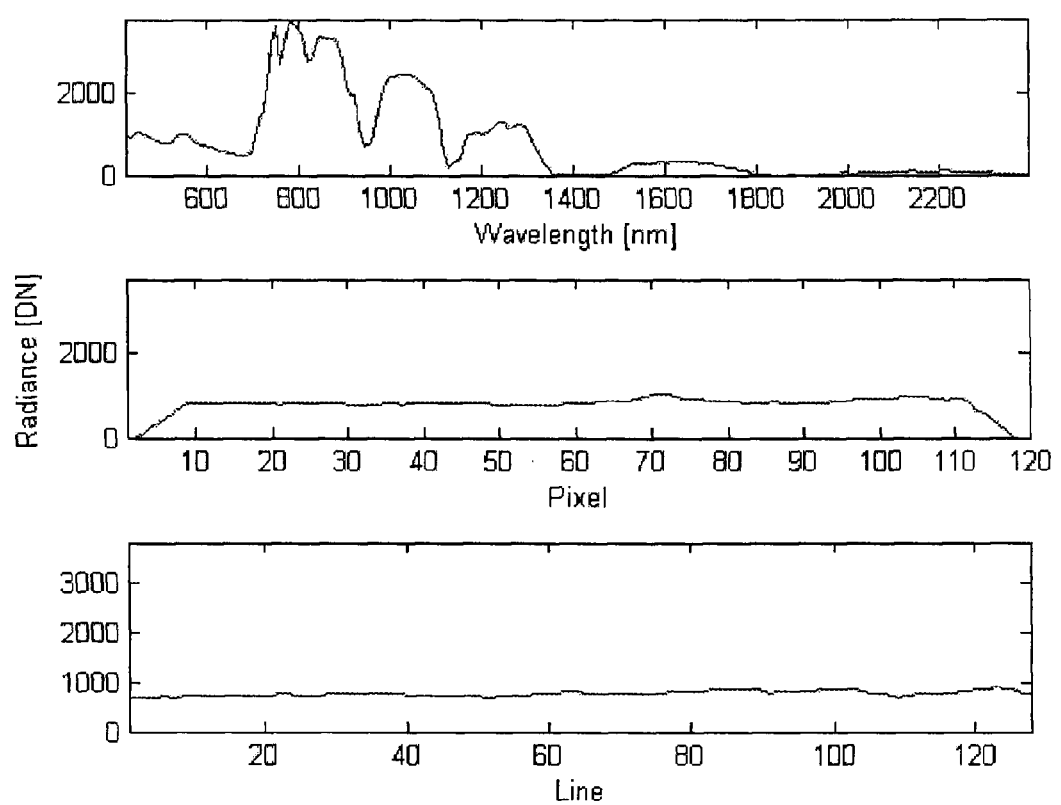
FIG. 5 shows the average radiance of the GVWD datacube.
Figure 6:
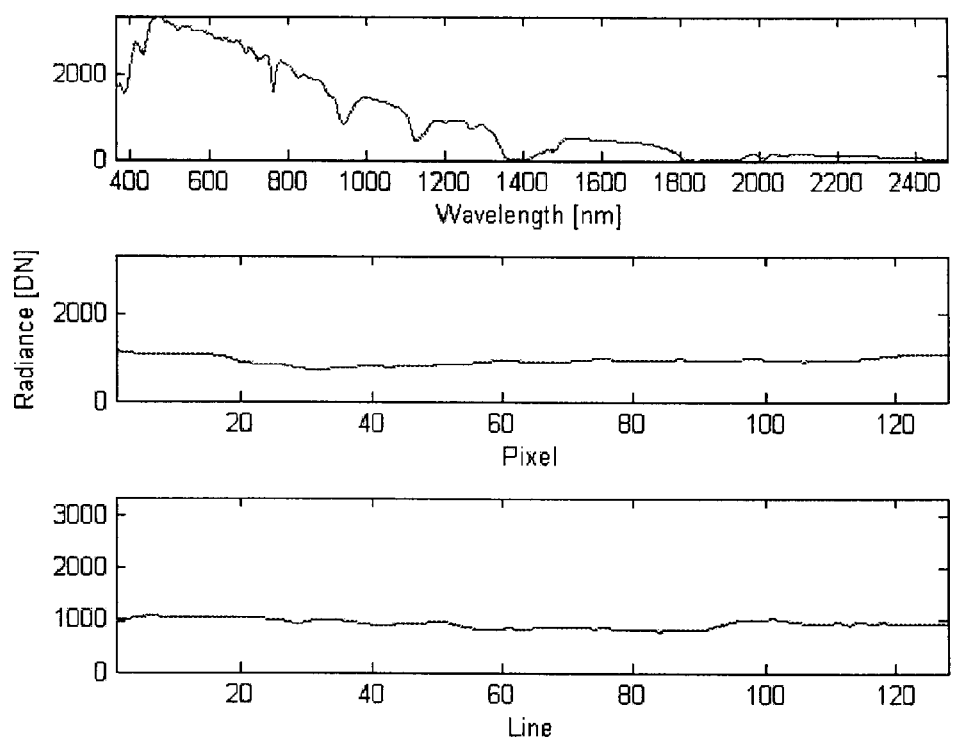
FIG. 6 shows the average radiance of the Curpite datacube.

One issue with the data is the variable noise level. The noise level is varying with signal level, based on sensor characteristics. Add to this, the signal properties in the spectral dimension are not the same as that in the spatial dimensions due to the difference in their physical nature. A simple observation of a datacube reveals that the degree of regularity is higher in the spatial dimensions than in the spectral dimension. This can also be concluded by comparing the average radiance across the spectral band axis, on one hand, against the average radiance across the pixel axis and the line axis on the other hand as depicted in FIG. 5 and FIG. 6. FIG. 5 shows the average radiance of the GVWD datacube across the band axis (top image), across the pixel axis (middle image) and across the line axis (bottom image). FIG. 6 shows the average radiance of the Cuprite datacube across the band axis (top image), across the pixel axis (middle image) and across the line axis (bottom image).

While the signal in the spatial domain can be seen as normal "real-life images" that carry considerable degree of regularity, the signal in the spectral domain shows a number of local sharp features. For example, it contains absorption peaks due to atmosphere contents, red-edge due to chlorophyll contents, and other narrow absorption peaks due to cell structure and mineral absorption properties.

This suggests that the variation of the noise variance in the spatial dimensions is, in general, less drastic than that in the spectral dimension. Yet, there is some dependency that exists among the three dimensions of the datacube. The 3-D wavelet shrinkage denoising method in [20] benefits from this dependency, but implicitly considers that the noise variance is the same in the three dimensions. There is proposed a Hybrid Spatial-Spectral Noise Reduction (HSSNR) scheme [22, 23] that operates almost independently in the two domains trying to accommodate the dissimilarity between the spatial and the spectral domains. In this scheme, noise is first removed from the spatial domain where the signal is relatively regular. Then, more noise, as well as some artifacts that may have been introduced during the spatial denoising, is removed in the spectral domain.

Noise Level Elevation for Effective Denoising

Due to the low average noise level, there exist a considerable risk of signal deformation during WS denoising. There is proposed a method to elevate the noise level temporarily and perform the denoising process in this condition, then reversibly de-elevate the noise level. This technique is suitable for WS denoising because of its nonlinear nature.

Elevating noise level is achieved by transforming hyperspectral datacube into the spectral derivative domain, which is equivalent to high-pass filtering. This leads to an increase in the noise-to-signal ratio because the signal power is concentrated in the low frequency region as shown in FIG. 2, whereas the noise is spread all over the Fourier spectrum.

The derivative of spectral band image is given by:

$$\theta(\lambda, p, l) = \frac{\partial y(\lambda, p, l)}{\partial \lambda} = \frac{y(\lambda + \delta_\lambda, p, l) - y(\lambda, p, l)}{\delta_\lambda} \quad (13)$$

where $\lambda$ is a spectral band center, p is a cross-track pixel number, l is an along-track line number and $\delta_\lambda$ is a small displacement in the spectral dimension.

Figure 7:
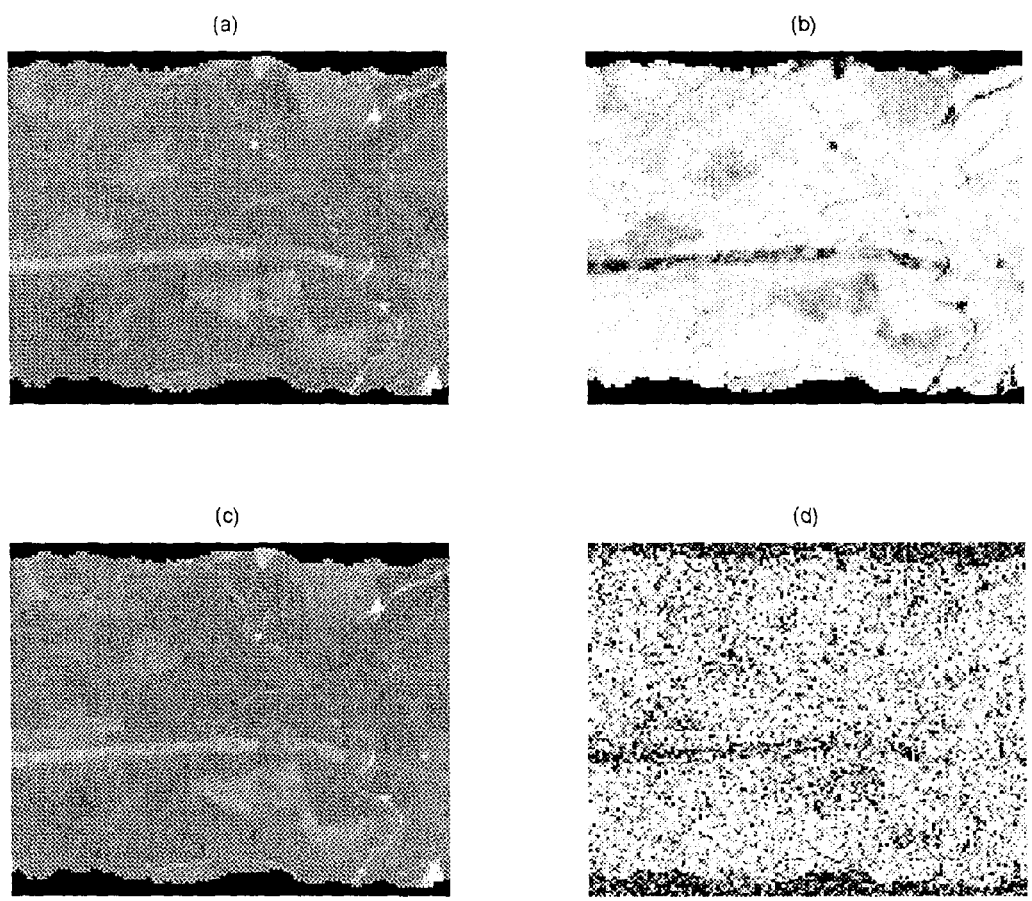
FIG. 7a-7d shows images at wavelength 470.93 nm from the pure and noisy GVWD datacubes and their derivative images.

The idea is illustrated in FIGS. 7a-7d, which shows images at wavelength 470.93 nm from the pure GVWD datacube and the noisy datacube, as well as their corresponding spectral derivative images. FIG. 7a shows the pure spectral band image of the GVWD datacube and FIG. 7b shows the spectral derivate of the pure band image. FIG. 7c shows the noisy spectral band image while FIG. 7d shows the spectral derivative of the noisy band image. Although the average noise level is so low that it is not visible in the noisy signal in FIG. 7c, the noise is clearly manifested in the derivative domain in FIG. 7d.

After transforming the noisy signal into the spectral derivative domain, the proposed HSSNR operates in the spatial and spectral domains independently, removing more noise with less signal deformation, then, the signal is transformed back from the derivative domain, i.e.:

$$\tilde{\theta} = IDWT2\{\eta_{spatial}(DWT2\{\theta\})\} \quad (14)$$

$$\hat{\theta} IDWT\{\eta_{spatial}(DWT\{\tilde{\theta}\})\} \quad (15)$$

where $\theta$, $\tilde{\theta}$ and $\hat{\theta}$ are the spectral derivative of the noisy datacube, the spatially denoised derivative of the noisy datacube and the spatially-spectrally denoised derivative of the noisy datacube, respectively, DWT2 is the 2-Dimensional (2-D) discrete wavelet transform applied to the along-track and across-track dimensions, IDWT2 is the associated 2-D inverse discrete wavelet transform, DWT is the 1-D discrete wavelet transform applied to the spectral dimension, IDWT is the 1-D inverse discrete wavelet transform, $\eta_{spatial}$ is a threshold function that is applied on band-by-band basis and $\eta_{spectral}$ is a threshold function that is applied to the spectra on pixel-by-pixel (i.e. spectrum-by-spectrum) basis.

The denoised signal, $\hat{x}(\lambda, p, l)$, is then retrieved by spectral integration, i.e.:

$$\hat{x}(\lambda_j, p, l) = \begin{cases} \hat{x}_1(p, l), & j = 1 \\ \hat{x}_1(p, l) + \sum_{i=1}^{j-1} \hat{\theta}(\lambda_i, p, l) \cdot \delta_\lambda, & j > 1 \end{cases} \quad (16)$$

where $\lambda_i$ and $\lambda_j$ are the center wavelengths of the $i^{th}$ and the $j^{th}$ spectral bands, respectively, and $\hat{x}_1(p,l) = y(\lambda_1, p, l)$.

Correction of the Integration Error

Let the error in the derivative domain at a given spectral band, i, be:

$$\varepsilon_{\hat{\theta}_i}(\lambda_i, p, l) = \hat{\theta}_i(\lambda_i, p, l) - \frac{\partial x(\lambda_i, p, l)}{\partial \lambda} \quad (17)$$

It can be shown that the variance of the integral error of the denoised signal at a single band j is given by:

$$\sigma^2_{\varepsilon_{\hat{x}}}(\lambda_j, p, l) = \left[\sum_{i=1}^{j-1}\sigma^2_{\varepsilon_{\hat{\theta}_i}} + 2\sum_{i=1}^{j-1}\sum_{k=i+1}^{j-1}\sigma^2_{\varepsilon_{\hat{\theta}_i}\varepsilon_{\hat{\theta}_k}}\right]\delta_\lambda^2, \, j > 1 \quad (18)$$

where $\sigma^2_{\varepsilon_{\hat{\theta}_i}}$ is the variance of $\varepsilon_i(\lambda_i, p, l)$ and $\sigma_{ik}^2$ is the covariance of $\varepsilon_i(\lambda_i, p, l)$ and $\varepsilon_k(\lambda_i, p, l)$.

If the error of the denoised signal in the derivative domain at a given pixel is assumed to be stationary, i.e.

$$\sigma_{\varepsilon_{\hat{\theta}_i}} = \sigma_{\varepsilon_{\hat{\theta}}}, \, \forall i \quad (19)$$

$$\sigma_{\varepsilon_{\hat{\theta}_i}}\sigma_{\varepsilon_{\hat{\theta}_k}} = \sigma_{\varepsilon_{\hat{\theta}}\varepsilon_{\hat{\theta}}}, \, \forall i, k, i \neq k \quad (20)$$

then, the expression of the denoised signal integral error at a single band $\lambda_j$ can be simplified as:

$$\sigma_{\varepsilon_{\hat{x}}}(\lambda_j, p, l) = [(j-1)\sigma_\varepsilon^2 + (j-1)(j-2)\sigma_{\varepsilon\varepsilon}]\delta_\lambda^2 \quad (21)$$

Accordingly, the mean square error of a given pixel (p,l) becomes:

$$\begin{aligned} MSE(p, l) &= \frac{\sum_{j=2}^{\Lambda}\sigma^2_{\varepsilon_{\hat{x}}}(\lambda_j, p, l)}{\Lambda} \\ &= \frac{\delta_\lambda^2}{\Lambda}\left[\sum_{j=2}^{\Lambda}(j-1)\sigma^2_{\varepsilon_{\hat{\theta}}} + \sum_{j=2}^{\Lambda}(j-2)(j-1)\sigma^2_{\varepsilon_{\hat{\theta}}\varepsilon_{\hat{\theta}}}\right] \\ &= \frac{\delta_\lambda^2}{\Lambda}\left[\frac{\Lambda}{2}(\Lambda-1)\sigma^2_{\varepsilon_{\hat{\theta}}} + \frac{\Lambda}{3}(\Lambda^2-3\Lambda+2)\sigma^2_{\varepsilon_{\hat{\theta}}\varepsilon_{\hat{\theta}}}\right] \\ &= \delta_\lambda^2\left[\Lambda^2\frac{\sigma^2_{\varepsilon_{\hat{\theta}}\varepsilon_{\hat{\theta}}}}{3} + \Lambda\left(\frac{\sigma^2_{\varepsilon_{\hat{\theta}}}}{2} - \sigma^2_{\varepsilon_{\hat{\theta}}\varepsilon_{\hat{\theta}}}\right) - \left(\frac{\sigma^2_{\varepsilon_{\hat{\theta}}}}{2} - \frac{2}{3}\sigma^2_{\varepsilon_{\hat{\theta}}\varepsilon_{\hat{\theta}}}\right)\right] \end{aligned} \quad (22)$$

The mean-square error accumulated due to integration is growing with $\Lambda$, the total number of spectral bands. Normally hyperspectral datacubes contain a large number of spectral bands, e.g. 205, which may result in accumulating an error (throughout the integration process) that is significantly larger than the initial noise. Recall that the noise level is initially low, from the problem definition. This means that the error accumulated in the integration process may not only reduce the denoising performance, but may also result in degradation of the signal quality if no action is taken.

Assuming that this error is uniformly distributed in the derivative domain, it will be concentrated in the low frequency region after the integration process, which can be seen as a sort of a low-pass filtering. An embodiment of this invention proposes a simple, yet efficient, solution to reduce this error in the low-frequency components of the denoised signal, $\hat{x}$. First, recall that the pure signal portion of y has most of its power located in the low frequency area whereas the noise power is uniformly distributed all over the Fourier frequency spectrum as shown in FIG. 2. Under these conditions the low frequency components of the signal y become a reliable replacement for the low-frequency components of the denoised signal, $\hat{x}$. The reason we are using y (instead of x) is that the pure signal x is supposed to be unknown, so it cannot be used in the course of the denoising process.

Figure 8:
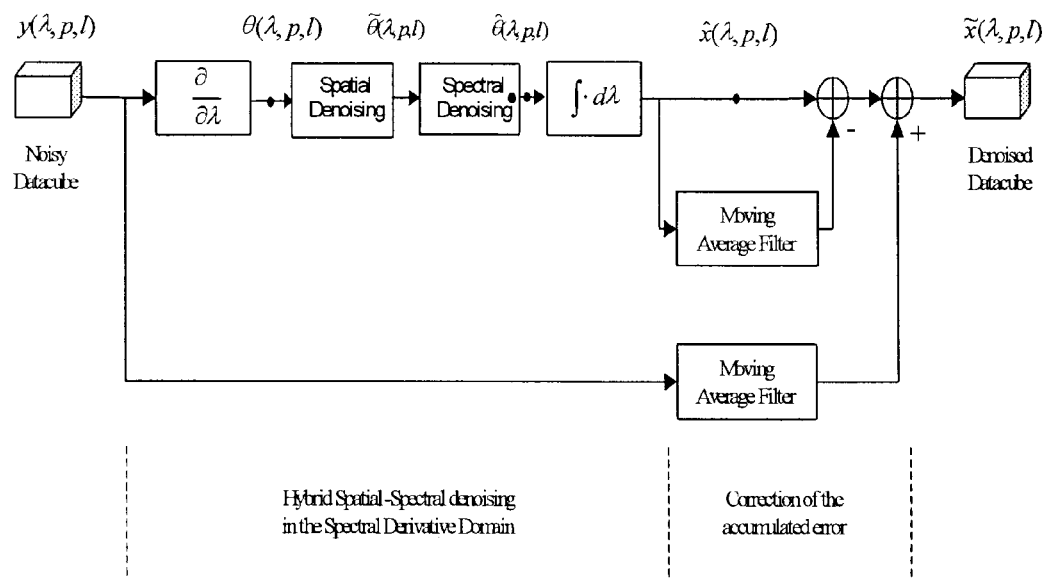
FIG. 8 illustrates a system for implementing one aspect of the invention.

This correction is achieved by using two identical low-pass filters (LPFs) as shown in FIG. 8. Given the large amount of data to be filtered, a simple LPF is preferred. We choose a Moving Average (MA) filter, because it requires no multipliers other than the gain factor. The MA filter is applied using a sliding window of width $\Delta+1$, which we refer to as the correction window. The correction window replaces the low-frequency components of the denoised signal, $\hat{x}(\lambda,p,l)$, by the low-frequency components of the noisy signal, $y(\lambda,p,l)$, i.e.:

$$\tilde{x}(\lambda_j, p, l) = \hat{x}(\lambda_j, p, l) - \frac{\sum_{i=j-\frac{\Delta}{2}}^{j+\frac{\Delta}{2}} \hat{x}(\lambda_i, p, l)}{\Delta} + \frac{\sum_{i=j-\frac{\Delta}{2}}^{j+\frac{\Delta}{2}} y(\lambda_i, p, l)}{\Delta} \quad (23)$$

where $\Delta+1$ is the width of the correction window, $\hat{x}$ is the denoised signal before correction and $\tilde{x}$ is the denoised signal after correction.

The cutoff frequency of the LPF is inversely proportional to the width of the correction window, meaning that a narrower window will replace a larger band of frequency components. For example, the ultimate case of single band window, i.e. $\Delta=0$, would result in replacing the whole denoised $\hat{x}$ signal (band-by-band) by the noisy signal y. The other extreme example is $\Delta=\Lambda-1$, which would result in replacing only the DC component of the denoised signal $\hat{x}$ with the DC of the noisy signal y.

In general, an extremely small width would cause the correction window to be susceptible to noise influence whereas a large width would cause it to fail in tracking the true signal variations.

The bandwidth of the filter is chosen to pass at least 98% of the signal power, which is at a Fourier normalized frequency that is slightly less than 0.1 as shown in FIG. 2. This is corresponding to a window width that is equal to 5 spectral bands.

The above approach may be summarized into a specific number of discreete steps. If one has a noisy datacube, to reduce the noise in the data, the following steps are taken First Order Spectral Derivative:
Compute the first-order spectral derivative for each spectral band image.
2-D Spatial Wavelet Shrinkage:
Compute 2-D wavelet transform for each spectral band image.
Estimate a threshold value for each spectral band image.
Perform soft threshold WS operation.
Compute Inverse 2-D wavelet transform
1-D spectral wavelet shrinkage:
At each spatial pixel of the datacube, compute 1-D wavelet transform for its spectrum.
Estimate a threshold value for each spectrum.
Perform soft threshold WS operation.
Compute Inverse 1-D wavelet transform
Signal Reconstruction:
Integrate along the spectral axis.
Correct for the accumulated errors.

To determine the effectiveness of the above approach, the denoised data may be evaluated next to the signal data as follows:
(If a pure version of the datacube (i.e. noise-free datacube) is available):
Compute the square root error between the denoised datacube and the pure version of the datacube. This is considered the noise after denoising.
Compute the SNR=$(P_X/P_N)$, where $P_X$ is the power of signal obtained from the pure datacube and $P_N$ is the noise power of the denoised datacube.
Compare with the SNR of the noisy datacube before denoising.

The steps relating to the proposed method are discussed in more detail below.

Noise Level Elevation for Effective Denoising

Usually, a data set acquired by a satellite sensor has a considerable high level SNR. In other words, the level of noise might be considerable low. There is a risk of signal deformation during WS denoising. In order to effectively remove the noise, we elevate the noise level temporarily and perform the denoising process in this condition, then reversibly de-elevate the noise level after denoising. This technique is suitable for WS denoising because of its nonlinear nature.

Elevating noise level is achieved by transforming hyperspectral datacube into the spectral derivative domain, which is equivalent to high-pass filtering. This leads to an increase in the noise-to-signal ratio because the signal power is concentrated in the low frequency region, whereas the noise is spread all over the Fourier spectrum. The derivative of a spectral band image at band $\lambda$ is given by:

$$\theta(\lambda, p, l) = \frac{\partial y(\lambda, p, l)}{\partial \lambda} = \frac{y(\lambda + \delta_\lambda, p, l) - y(\lambda, p, l)}{\delta_\lambda} \quad (24)$$

where $\lambda$ is a spectral band center, p is a cross-track pixel number, l is an along-track line number of a noisy datacube $y(\lambda,p,l)$ $\lambda=1, 2, \ldots, N_b$; $p=1, 2, \ldots, N_c$; $l=1, 2, \ldots, N_r$ and $\delta_\lambda$ is a small displacement in the spectral dimension. $N_b$, $N_c$, $N_r$ are the total number of bands, total number of pixels per line and total number of cross-track lines of the datacube.

Noise Removal in Spatial Domain

After transforming the noisy signal into the spectral derivative domain, compute 2-D wavelet transform for each spectral band image of the spectral derivative of the noisy datacube; estimate a threshold value for each spectral band image; perform soft threshold operation; compute inverse 2-D wavelet transform, i.e.:

$$\tilde{\theta}(\lambda)=\text{IDWT2}\{\eta_{spatial}(\text{DWT2}\{\theta(\lambda)\})\} \; \lambda=1,2,3,\ldots,N_b \quad (25)$$

where $\theta(\lambda)$ and $\tilde{\theta}(\lambda)$ are the spectral derivative of band image at band $\lambda$ of the noisy datacube and the spatially denoised derivative spectral band image of the noisy datacube respectively. DWT2 is the 2-D discrete wavelet transform applied to the spectral derivative of the band images (two spatial dimensions, i.e. along-track and across-track dimensions). IDWT2 is the associated 2-D inverse discrete wavelet transform. $\eta_{spatial}$ is a threshold function that is applied on band-by-band basis.

Noise Removal in Spectral Domain

Compute 1-D wavelet transform for the spectrum of each spatial pixel at location (p,l) of the spatially denoised datacube, estimate a threshold value for each spectrum, perform soft threshold operation, compute inverse 1-D wavelet transform, i.e.:

$$\hat{\theta}(p,l)=\text{IDWT2}\{\eta_{spectral}(\text{DWT}\{\tilde{\theta}(p,l)\})\} \\ p=1,2,\ldots,N_c; \; l=1,2,\ldots,N_r \quad (26)$$

where $\tilde{\theta}(p,l)$ and $\hat{\theta}(p,l)$ are the spectrum derivative of the spatially denoised datacube at spatial location (p,l) and the spatially-spectrally denoised spectrum derivative of the datacube at the same location respectively. DWT is the 1-D discrete wavelet transform applied to the spectra (i.e. spectral domain), IDWT is the associated 1-D inverse discrete wavelet transform, $\eta_{spectral}$ is a threshold function that is applied to the spectra on pixel-by-pixel basis.

Integration Along the Spectral Axis

The WS denoising is performed in derivative domain. The denoised derivatives need to be converted to the original spatial and spectral domains. The denoised signal, $\hat{x}(\lambda,p,l)$, is then retrieved by spectral integration, i.e.:

$$\hat{x}(\lambda_j, p, l) = \begin{cases} \hat{x}_1(p, l), & j = 1 \\ \hat{x}_1(p, l) + \sum_{i=1}^{j-1} \hat{\theta}(\lambda_i, p, l) \cdot \delta_\lambda, & j > 1 \end{cases} \quad (27)$$

where $\lambda_i$ and $\lambda_j$ are the center wavelengths of the $i^{th}$ and the $j^{th}$ spectral bands respectively, and $\hat{x}_1(p,l)=y(\lambda_1,p,l)$.

Correction of the Integration Error

Due to the existence of error of the denoised signal in the derivative domain, the accumulation error after integration can be significantly larger than the initial noise (recall that the noise level is initially low from the problem definition). This means that the error accumulated in the integration process may not only reduce the denoising performance and cause instability, but may also result in degradation of the signal quality if no action is taken. To overcome this problem the integration error is corrected by cancelling the accumulated error and compensating the cancelled signal using two identical low-pass filters as shown in the block diagram of the method and system. Moving average (MA) filters are used. The MA filter is applied using a sliding window of width $\Delta+1$, which we refer to as the correction window. The correction window replaces the low-frequency components of the denoised signal, $\hat{x}(\lambda,p,l)$, by the low-frequency components of the noisy signal, $y(\lambda,p,l)$, i.e.:

$$\tilde{x}(\lambda_j, p, l) = \hat{x}(\lambda_j, p, l) - \frac{\sum_{i=j-\frac{\Delta}{2}}^{j+\frac{\Delta}{2}} \hat{x}(\lambda_i, p, l)}{\Delta} + \frac{\sum_{i=j-\frac{\Delta}{2}}^{j+\frac{\Delta}{2}} y(\lambda_i, p, l)}{\Delta} \quad (28)$$

where $\Delta+1$ is the width of the correction window, $\hat{x}(\lambda,p,l)$ is the denoised signal before correction and $\tilde{x}(\lambda,p,l)$ is the denoised signal after correction.

The cutoff frequency of the low-pass filter is inversely proportional to the width of the correction window. A narrower window will replace a larger band of frequency components. The bandwidth of the filter is chosen to pass at least 98% of the signal power, which is at a Fourier normalized frequency that is slightly less than 0.1. This is corresponding to a window width that is equal to 5 spectral bands.

The proposed method was applied to the test datacubes and the results of this exercise are detailed in the below. The reason more than one datacube are considered, is to examine the proposed method for two major application types, namely vegetation and mineral applications. The GVWD datacube is an example of vegetation-dominated scene whereas the Cuprite datacube represents a scene that is rich in minerals.

The assessment is carried out in terms of SNR that is defined by:

$$SNR_{denoised} = \left(\frac{P_X}{P_{\tilde{N}}}\right) \quad (29)$$

where $P_X$ is the power of the pure signal $x(\lambda,p,l)$ and $P_{\tilde{N}}$ is the noise power in the denoised datacube $\tilde{x}(\lambda,p,l)$. i.e.:

$$SNR_{denoised} = \left(\frac{\sum_{j=1,p=1,l=1}^{\Lambda,P,L} |x(\lambda_j, p, l)|^2}{\sum_{j=1,p=1,l=1}^{\Lambda,P,L} |\tilde{x}(\lambda_j, p, l) - x(\lambda_j, p, l)|^2}\right) \quad (30)$$

A detailed assessment is also provided, which is represented in terms of SNR per band image of the datacube:

$$SNR(\lambda_j) = \left(\frac{\sum_{p=1,l=1}^{P,L} |x(\lambda_j, p, l)|^2}{\sum_{p=1,l=1}^{P,L} |\tilde{x}(\lambda_j, p, l) - x(\lambda_j, p, l)|^2}\right), j = 1, \ldots, \Lambda \quad (31)$$

Table 1 and Table 3 list the $SNR_{denoised}$ after denoising the GVWD and the Cuprite datacubes, respectively, as well as the initial SNR before denoising of the noisy datacubes. Two types of wavelet families are implemented, namely Daubechies(N) and Coiflets(N) wavelets, where N is the order of the wavelet function. They both have N wavelet vanishing moments, however, Daubechies have more compact support whereas Coiflets have 2N−1 scaling function vanishing moments[21]. The experiment is limited to one level of wavelet decomposition in order to allow for higher order wavelets to be examined. Three WS threshold methods are used, namely BayesShrink, SURE and Minimax.

Table 1 below shows that the initial SNR of the noisy GVWD datacube is 2144.14 and the SNR after baseline WS denoising is up to 2335.71. The undecimated WS denoising and the 3-D WS denoising provide SNR up to 2453.57 and 2695.36, respectively. These results are consistent with the conclusions in [7] and [21] regarding the undecimated WS denoising and the 3-D WS denoising being better than the baseline WS, respectively. The Inter-Band Correlation (IBC) WS and the Besov Ball Projections (BBP) WS provide SNR of 2304.7 and 570.39, respectively. Although the latter two methods are efficient in removing fixed-variance noise at medium SNR, their performance is different for varying low-level noise environment. This is because they assume a fixed noise variance. It should be noted that The threshold and the wavelet columns do not apply to the Initial, the IBC and the BBP SNR columns. The initial SNR exists before denoising, whereas the IBC and the BBP utilize their own threshold criteria.

TABLE 1

| | | Signal-to-Noise Ratio | | | | | | |
|---|---|---|---|---|---|---|---|---|
| Threshold | Wavelet | Initial | IBC | BBP | Baseline | 3-D | Undecimated | HSSNR |
| Bayes | db1 | 2144.14 | 2304.7 | 570.39 | 2181.31 | 2202.24 | 2200.57 | 3892.45 |
| | db2 | | | | 2183.94 | 2202.74 | 2190.39 | 3841.66 |
| | db3 | | | | 2192.41 | 2202.90 | 2192.49 | 3878.15 |

TABLE 1-continued

| Threshold | Wavelet | Initial | IBC | BBP | Baseline | 3-D | Undecimated | HSSNR |
|---|---|---|---|---|---|---|---|---|
|  | db4 |  |  |  | 2192.62 | 2198.83 | 2190.59 | 3933.63 |
|  | db5 |  |  |  | 2189.18 | 2195.13 | 2189.67 | 3900.45 |
|  | db6 |  |  |  | 2189.66 | 2195.26 | 2192.14 | 3865.07 |
|  | coif1 |  |  |  | 2188.53 | 2201.29 | 2193.81 | 3858.83 |
|  | coif2 |  |  |  | 2187.55 | 2197.42 | 2193.76 | 3948.07 |
|  | coif3 |  |  |  | 2186.77 | 2194.33 | 2192.98 | 3954.85 |
| SURE | db1 |  |  |  | 2141.59 | 2294.17 | 2305.68 | 3609.94 |
|  | db2 |  |  |  | 2248.93 | 2296.11 | 2307.95 | 3669.07 |
|  | db3 |  |  |  | 2279.28 | 2298.39 | 2307.04 | 3713.62 |
|  | db4 |  |  |  | 2264.94 | 2285.75 | 2305.69 | 3736.42 |
|  | db5 |  |  |  | 2258.41 | 2279.60 | 2290.29 | 3724.52 |
|  | db6 |  |  |  | 2275.47 | 2284.64 | 2306.26 | 3722.1 |
|  | coif1 |  |  |  | 2244.62 | 2290.07 | 2313.40 | 3624.26 |
|  | coif2 |  |  |  | 2270.72 | 2285.51 | 2310.86 | 3792.62 |
|  | coif3 |  |  |  | 2278.47 | 2280.37 | 2309.68 | 3775.62 |
| Minimax | db1 |  |  |  | 1787.80 | 2488.70 | 2410.87 | 3047.76 |
|  | db2 |  |  |  | 2209.00 | 2648.42 | 2453.57 | 3080.8 |
|  | db3 |  |  |  | 2313.47 | 2695.36 | 2424.44 | 3205.94 |
|  | db4 |  |  |  | 2294.75 | 2664.46 | 2415.04 | 3222.85 |
|  | db5 |  |  |  | 2277.98 | 2626.84 | 2373.35 | 3215.34 |
|  | db6 |  |  |  | 2309.15 | 2649.96 | 2406.08 | 3215.22 |
|  | coif1 |  |  |  | 2189.95 | 2613.86 | 2443.94 | 3313.08 |
|  | coif2 |  |  |  | 2307.12 | 2637.13 | 2416.37 | 3321.07 |
|  | coif3 |  |  |  | 2335.71 | 2630.40 | 2406.98 | 3296.48 |
| Maximum SNR |  |  | 2304.7 | 570.39 | 2335.71 | 2695.36 | 2335.71 | 3954.85 |
| Maximum improvement |  |  | 7.48% | 73.40% | 8.93% | 25.70% | 8.93% | 84.44% |

The proposed method provides an SNR up to 3954.85, which constitutes an improvement of 84.44%. If the two components of the proposed method, i.e. the hybrid spatial-spectral (HSS) component and the Spectral Derivative (SD) component, are applied separately, they provide improvements of up to 56.99% and 5.77%, respectively, as shown in Table 2. Yet, when they are combined, they achieve an SNR improvement (84.44%) that is significantly higher than the sum of the individual SNR improvements of the two components.

TABLE 2

| Threshold | Wavelet | Initial | HSS | SD | HSSNR |
|---|---|---|---|---|---|
| Bayes | db1 | 2144.14 | 3116.12 | 2189.49 | 3892.45 |
|  | db2 |  | 3193.63 | 2187.25 | 3841.66 |
|  | db3 |  | 3195.76 | 2183.31 | 3878.15 |
|  | db4 |  | 3179.19 | 2185.04 | 3933.63 |
|  | db5 |  | 3188.24 | 2190.66 | 3900.45 |
|  | db6 |  | 3241.70 | 2192.18 | 3865.07 |
|  | coif1 |  | 3189.16 | 2194.41 | 3858.83 |
|  | coif2 |  | 3166.21 | 2194.04 | 3948.07 |
|  | coif3 |  | 3184.82 | 2192.34 | 3954.85 |
| SURE | db1 |  | 3059.12 | 2249.59 | 3609.94 |
|  | db2 |  | 3289.10 | 2252.81 | 3669.07 |
|  | db3 |  | 3302.58 | 2251.93 | 3713.62 |
|  | db4 |  | 3250.88 | 2251.63 | 3736.42 |
|  | db5 |  | 3350.12 | 2256.77 | 3724.52 |
|  | db6 |  | 3303.26 | 2251.58 | 3722.1 |
|  | coif1 |  | 3282.07 | 2262.14 | 3624.26 |
|  | coif2 |  | 3316.94 | 2262.82 | 3792.62 |
|  | coif3 |  | 3361.96 | 2260.35 | 3775.62 |
| Minimax | db1 |  | 2385.41 | 2227.31 | 3047.76 |
|  | db2 |  | 3057.43 | 2217.05 | 3080.8 |
|  | db3 |  | 3246.80 | 2217.27 | 3205.94 |
|  | db4 |  | 3303.00 | 2216.75 | 3222.85 |
|  | db5 |  | 3191.61 | 2229.14 | 3215.34 |
|  | db6 |  | 3248.05 | 2225.64 | 3215.22 |
|  | coif1 |  | 3031.64 | 2268.08 | 3313.08 |
|  | coif2 |  | 3280.58 | 2258.13 | 3321.07 |

TABLE 2-continued

| Threshold | Wavelet | Initial | HSS | SD | HSSNR |
|---|---|---|---|---|---|
|  | coif3 |  | 3366.27 | 2249.5 | 3296.48 |
| Maximum SNR |  |  | 3366.27 | 2268.08 | 3954.85 |
| Maximum improvement |  |  | 56.99% | 5.77% | 84.44% |

Figure 9:
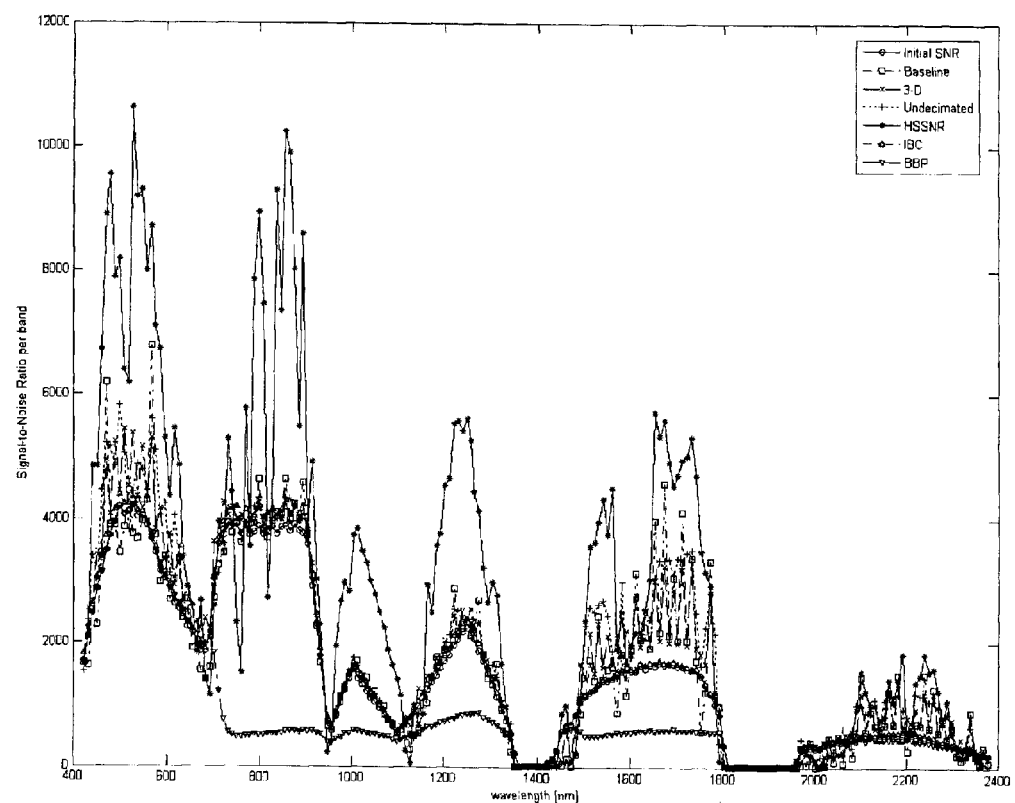
FIG. 9 shows the signal-to-noise ratio per band after noise reduction for the GVWD datacube using various noise reduction techniques.

The detailed per-band performance of the proposed method is plotted in FIG. 9, along with the performance of the other methods. The proposed HSSNR method shows SNR-per-band that is significantly higher than the other methods for most of the bands. FIG. 9 shows the signal-to-noise ratio per band after noise reduction using Baseline WS, 3-D WS, Undecimated WS, the proposed Hybrid Spatial-Spectral derivative domain Noise Reduction (HSSNR) method, the Inter-Band Correlation (IBC) WS and the Besov Ball Projections (BBP) WS when applied to an AVIRIS Greater Victoria Watershed District (GVWD) datacube.

Figure 10:
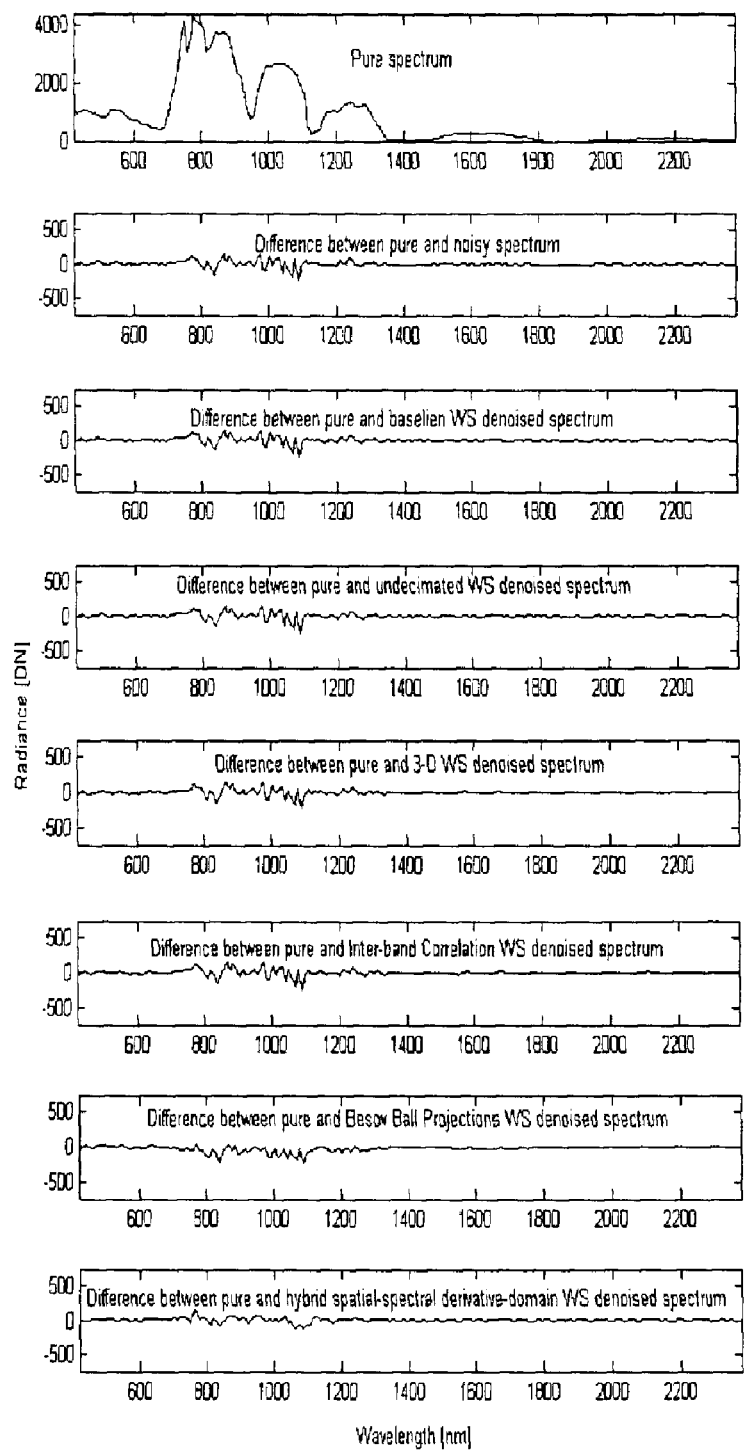
FIG. 10 illustrates the spectrum of one of the pixels of the GVWD datacube and the difference between its noisy spectrum and its spectrum after denoising using various noise reduction techniques.

FIG. 10 shows a spectrum of an arbitrary pixel from the pure GVWD datacube, the difference between the pure spectrum, on one hand, and, on the other hand the spectra of the same pixel before and after being denoised by: the baseline WS, the undecimated WS, the 3-D WS, the proposed HSSNR method, the inter-band correlation WS and the Besov ball projections WS. At this particular pixel, the 3-D WS, the inter-band correlation WS and the Besov ball projections WS perform well in the range 1800 nm to 2400 nm but on average, the difference spectrum of the proposed HSSNR WS is the smallest. It outperforms the other methods in the range 800 nm to 1200 nm where most of the error is located.

The same procedure is applied to the simulated Cuprite datacube, where similar results are obtained. Table 3 shows that the proposed HSSNR method improves the datacube SNR from an initial value of 3961.45 to up to 7857.42, i.e. 98.35% improvement in SNR, which is significantly higher than the other methods.

TABLE 3

| Threshold | Wavelet | Initial | IBC | BBP | Signal-to-Noise Ratio | | | |
|---|---|---|---|---|---|---|---|---|
| | | | | | Baseline | 3-D | Undecimated | HSSNR |
| Bayes | db1 | 3961.45 | 4009.8 | 4811.3 | 4095.78 | 4104.68 | 4180.12 | 7701.26 |
| | db2 | | | | 4155.23 | 4105.24 | 4119.73 | 7836.04 |
| | db3 | | | | 4117.36 | 4097.98 | 4119.48 | 7851.5 |
| | db4 | | | | 4075.04 | 4085.46 | 4091.07 | 7822.81 |
| | db5 | | | | 4107.69 | 4072.97 | 4116.19 | 7833.65 |
| | db6 | | | | 4127.16 | 4072.09 | 4113.99 | 7857.42 |
| | coif1 | | | | 4133.03 | 4092.65 | 4139.72 | 7776.29 |
| | coif2 | | | | 4136.37 | 4080.04 | 4138.73 | 7823.33 |
| | coif3 | | | | 4126.39 | 4068.22 | 4135.37 | 7830.65 |
| SURE | db1 | | | | 3953.97 | 4257.18 | 4389.82 | 7347.1 |
| | db2 | | | | 4159.19 | 4262.01 | 4341.48 | 7556.6 |
| | db3 | | | | 4142.73 | 4252.43 | 4362.60 | 7472.72 |
| | db4 | | | | 4146.89 | 4228.99 | 4329.70 | 7190.36 |
| | db5 | | | | 4214.45 | 4213.35 | 4343.26 | 7322.09 |
| | db6 | | | | 4198.77 | 4215.85 | 4303.48 | 7359.12 |
| | coif1 | | | | 4171.33 | 4245.49 | 4387.40 | 7382.36 |
| | coif2 | | | | 4219.21 | 4231.11 | 4359.86 | 7207.1 |
| | coif3 | | | | 4209.66 | 4207.51 | 4329.98 | 7027.23 |
| Minimax | db1 | | | | 2912.40 | 4894.91 | 4292.86 | 5539.13 |
| | db2 | | | | 3656.91 | 5029.92 | 4277.33 | 6281.65 |
| | db3 | | | | 3738.37 | 5000.67 | 4335.80 | 6258.74 |
| | db4 | | | | 3863.42 | 4935.81 | 4352.21 | 5674.91 |
| | db5 | | | | 3965.31 | 4886.66 | 4292.55 | 5815.23 |
| | db6 | | | | 3874.81 | 4898.25 | 4099.59 | 5733.14 |
| | Coif1 | | | | 3738.06 | 4928.87 | 4359.16 | 5621.51 |
| | Coif2 | | | | 3932.91 | 4953.54 | 4238.10 | 5507.56 |
| | Coif3 | | | | 3927.96 | 4888.12 | 4125.23 | 5351.74 |
| Maximum SNR | | | 4009.8 | 4811.3 | 4219.21 | 5029.92 | 4389.82 | 7857.42 |
| Maximum improvement | | | 1.22% | 21.45% | 6.51% | 26.97% | 10.81% | 98.35% |

The threshold and the wavelet columns do not apply to the Initial, the IBC and the BBP SNR columns. The initial SNR exists before denoising, whereas the IBC and the BBP utilize their own threshold criteria..

Figure 11:
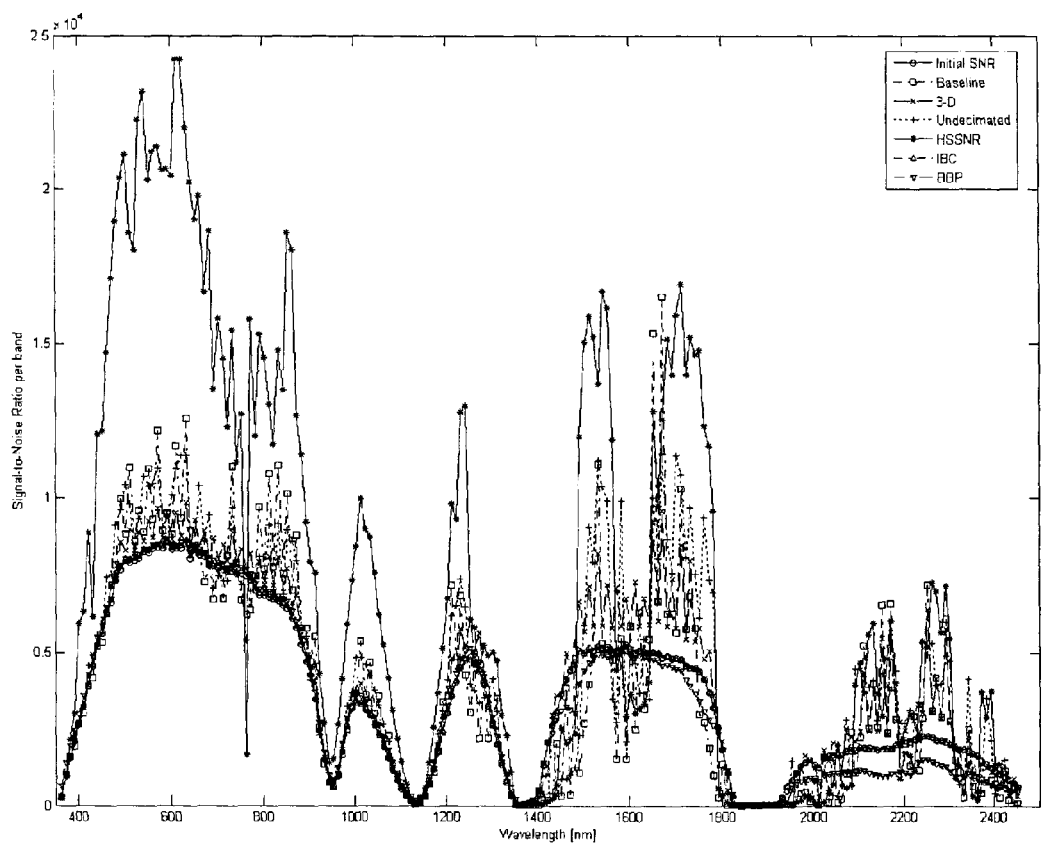
FIG. 11 shows the signal-to-noise ratio per band after noise reduction for the Cuprite datacube using various noise reduction techniques.
Figure 12:
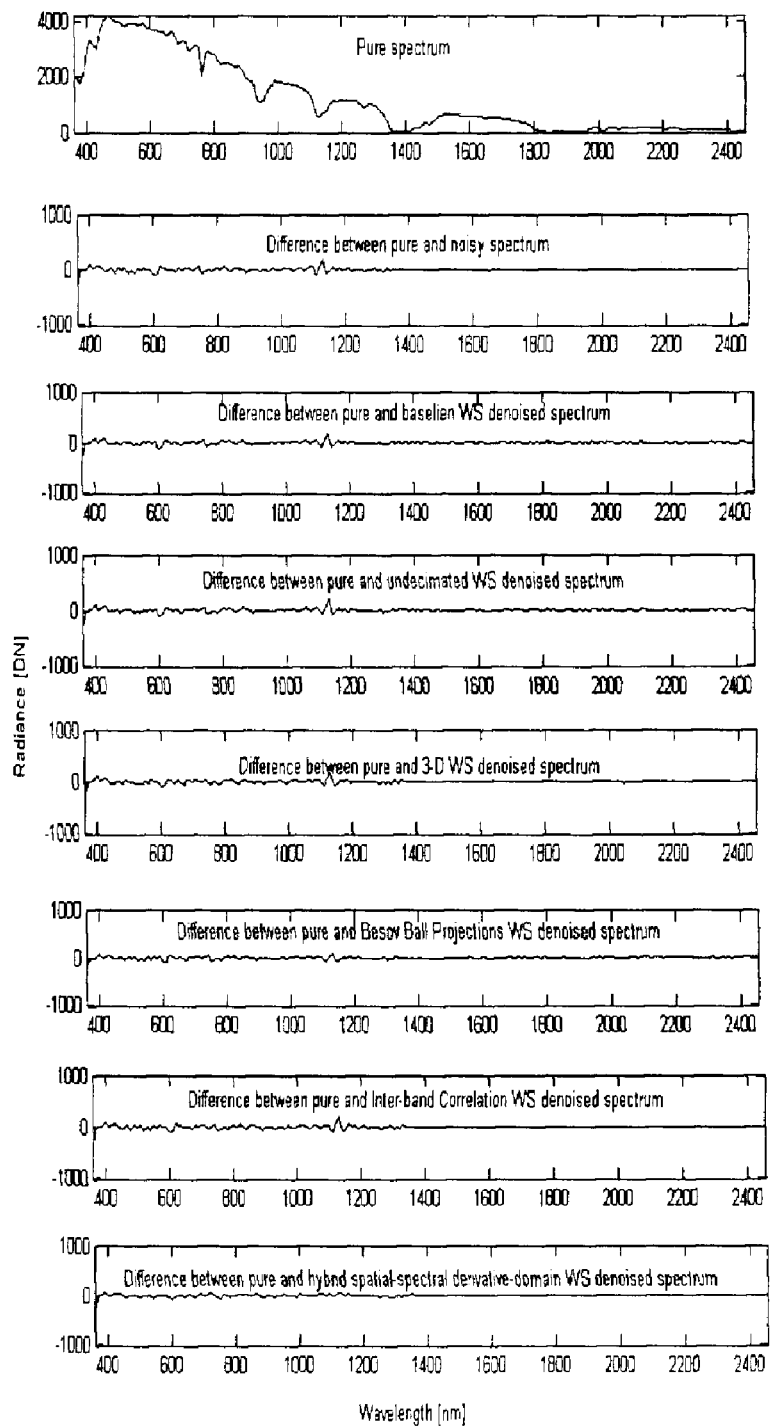
FIG. 12 illustrates the spectrum of one of the pixels of the GVWD datacube and the difference between its noisy spectrum and its spectrum after denoising using various noise reduction techniques.

FIG. 11 shows that the Cuprite datacube SNR-per-band after being denoised by the proposed method is higher than the other methods especially in the VNIR region. Similar to the results obtained from the GVWD datacube, the detailed results from the Cuprite datacube in Table 4 show that the most contribution in the proposed HSSNR method is due to the HSS component.

TABLE 4

| Threshold | Wavelet | Initial | Signal-to-Noise Ratio | | |
|---|---|---|---|---|---|
| | | | HSS | SD | HSSNR |
| Bayes | db1 | 3961.45 | 6402.75 | 4116.97 | 7701.26 |
| | db2 | | 6987.16 | 4113.64 | 7836.04 |
| | db3 | | 7036.17 | 4120.68 | 7851.5 |
| | db4 | | 6954.16 | 4099.43 | 7822.81 |
| | db5 | | 7005.03 | 4069.45 | 7833.65 |
| | db6 | | 7058.23 | 4084.97 | 7857.42 |
| | coif1 | | 6958.39 | 4068.83 | 7776.29 |
| | coif2 | | 7106.11 | 4070.69 | 7823.33 |
| | coif3 | | 7150.14 | 4073.61 | 7830.65 |
| SURE | db1 | | 5795.65 | 4135.73 | 7347.1 |
| | db2 | | 6119.52 | 4200.26 | 7556.6 |
| | db3 | | 6035.88 | 4216.78 | 7472.72 |
| | db4 | | 6326.09 | 4151.98 | 7190.36 |
| | db5 | | 6523.69 | 4124.39 | 7322.09 |
| | db6 | | 6610.59 | 4129.4 | 7359.12 |
| | coif1 | | 6566.00 | 4123.82 | 7382.36 |
| | coif2 | | 6827.50 | 4095.53 | 7207.1 |
| | coif3 | | 6764.86 | 4075.53 | 7027.23 |
| Minimax | db1 | | 3635.12 | 3652.57 | 5539.13 |
| | db2 | | 4628.89 | 3912.23 | 6281.65 |
| | db3 | | 4834.81 | 3977.97 | 6258.74 |
| | db4 | | 5374.37 | 3828.94 | 5674.91 |
| | db5 | | 5626.58 | 3790.01 | 5815.23 |
| | db6 | | 5521.57 | 3768.53 | 5733.14 |
| | coif1 | | 5453.94 | 3728.91 | 5621.51 |
| | coif2 | | 5968.79 | 3677.9 | 5507.56 |
| | coif3 | | 5829.89 | 3640.69 | 5351.74 |
| Maximum SNR | | | 7150.14 | 4216.78 | 7857.42 |
| Maximum improvement | | | 80.49% | 6.45% | 98.35% |

FIG. 11 shows a spectrum of an arbitrary pixel from the pure Cuprite datacube, the difference between the pure spectrum, on one hand, and, on the other hand, the spectra of the same pixel before and after being denoised by the various methods. The difference spectrum of the proposed HSSNR WS is smaller than the difference spectra of the other methods, while the Besov ball projection WS is the second best, e.g. compare the difference spectra around 800 nm, 1000 nm and 1100 nm.

Figure 3:
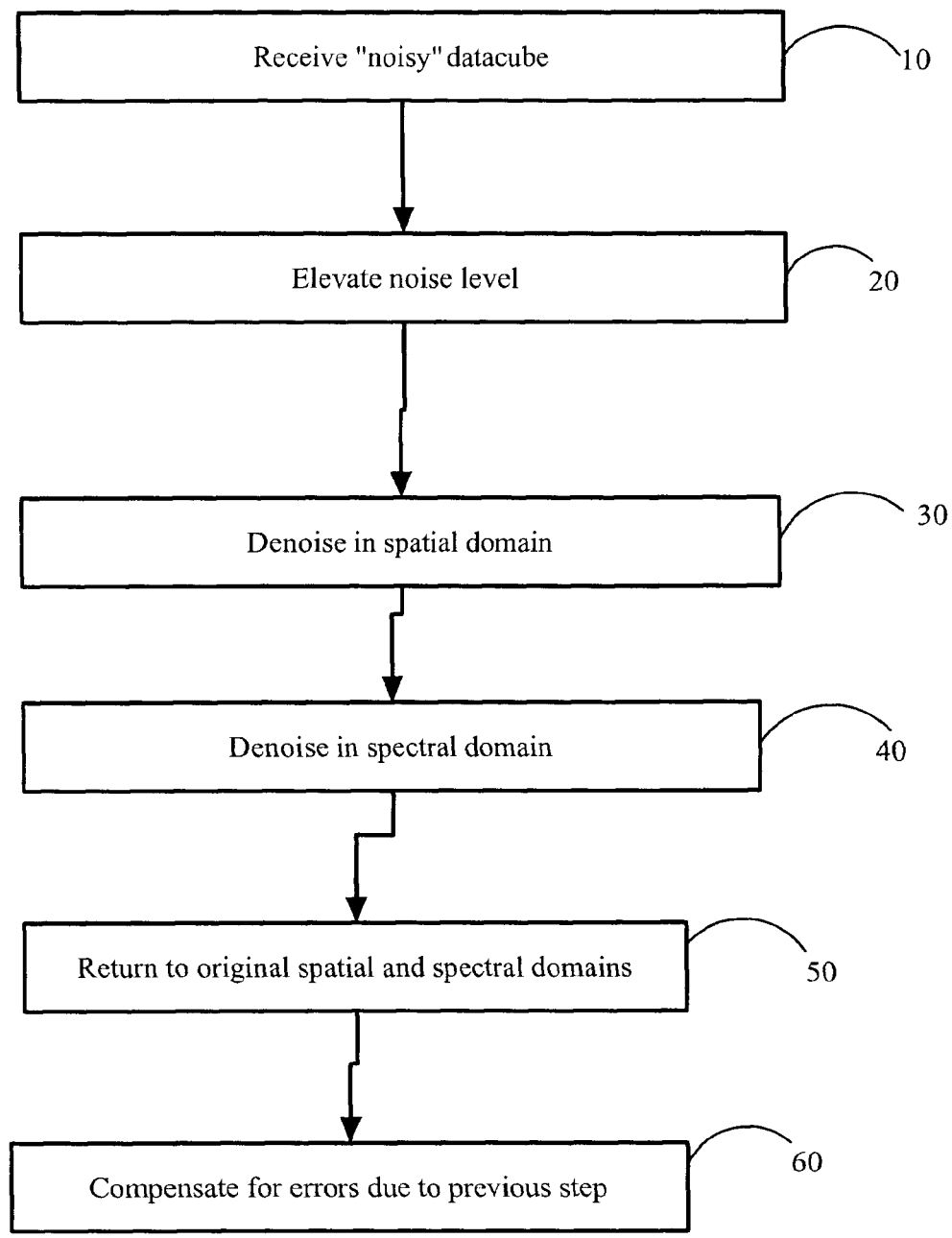
FIG. 3 is a flowchart illustrating the various steps of one aspect of the invention.

The proposed method may be seen as a distinct series of steps to be executed. Such a series of steps may be diagrammed as a flowchart as show in FIG. 3.

The method begins in step 10, that of receiving the "noisy" datacube. Step 20 then elevates the noise level in the data/signal. This can be done by transforming the hyperspectral datacube into the spectral derivative domain.

Step 30 is that of denoising the image in the spatial domain. This can be done by, in turn, computing the 2D wavelet transform for each spectral band image of the spectral derivative of the noisy datacube, estimating a threshold value for each spectral band image, performing a soft threshold WS operation, and then computing an inverse 2-D wavelet transform.

Step 40 then denoises the image in the spectral domain. This is ideally done on the spatially denoised datacube but it can be done after step 20. The denoising in the spectral domain is similar to step 30. It may be done by: computing the 1D wavelet transform for the spectrum of each spatial pixel at a specific location of the datacube, estimating a threshold value for each spectrum, performing a soft threshold WS operation, and then computing an inverse 1-D wavelet transform.

After denoising, the signal is then retrieved to result in the original spatial and spectral domains by integration (step 50). However, since integration may introduce errors into the data, these errors are corrected for in step 60. Such correction may take the form of compensating the cancelled signal using low pass filters which use a moving average or a sliding/correction window.

While the method results from the development of improving signal-to-noise ratio (SNR) of multi-dimensional satellite sensor data, it is also applicable to any field in which three-dimensional or more data, such as airborne hyperspectral imaging, medical imaging (CAT scans and MRI) etc.

The invention may also take the form of a system that executes the steps in the method. Such a system is illustrated in FIG. 8.

Referring to FIG. 8, the system receives the noisy datacube $y(\lambda,p,l)$ at the leftmost side of the diagram. A spectral derivative block takes the spectral derivative of the datacube and converts the datacube into its spectral derivative $\theta(\lambda)$. A spatial denoising block then executes spatial denoising on $\theta(\lambda)$ to result in $\tilde{\theta}(\lambda)$, the spatially denoised result. A spectral denoising block then executes spectral denoising on $\tilde{\theta}(\lambda)$ to result in $\hat{\theta}(p,l)$ the spectrally denoised result at point (p,l). The resulting $\hat{\theta}(p,l)$ is then integrated by an integration block to result in $\hat{x}(\lambda,p,l)$, the denoised signal. Two identical moving average filters (basically low pass filters) then correct $\hat{x}(\lambda,p,l)$—one filter filters $\hat{x}(\lambda,p,l)$ and subtracts the result from $\hat{x}(\lambda,p,l)$. Another filter filters the original data $y(\lambda,p,l)$ and adds the result to $\hat{x}(\lambda,p,l)$. This results in the final denoised datacube $\tilde{x}(\lambda,p,l)$.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

The invention claimed is:

1. A method for improving a signal to noise ratio of data in a multidimensional datacube, said data being in an original domain, the method comprising the steps of:
   a) elevating a noise level of said data
   b) removing noise from said data in a spatial domain
   c) removing noise from said data in a spectral domain to result in denoised data
   d) converting denoised data into said original domain
   e) correcting errors introduced to said data by step d).

2. A method according to claim 1 wherein step a) is accomplished by transforming said datacube into a spectral derivative domain.

3. A method according to claim 2 wherein said datacube is transformed to said spectral derivative domain by using a formula $$\theta(\lambda, p, l) = \frac{\partial y(\lambda, p, l)}{\partial \lambda} = \frac{y(\lambda + \delta_\lambda, p, l) - y(\lambda, p, l)}{\delta_\lambda}$$

where
   $\lambda$ is a spectral band center,
   p is a cross-track pixel number,
   l is an along-track line number of said datacube $y(\lambda,p,l)$
      $\lambda=1, 2, \ldots, N_b$; $p=1, 2, \ldots, N_c$; $l=1, 2, \ldots, N_r$ represents said datacube in said original domain and
   $\delta_\lambda$ is a small displacement in the spectral dimension
   $N_b$, is a total number of bands
   $N_c$, is a total number of pixels per line
   $N_r$ is a total number of cross-track lines of the datacube.

4. A method according to claim 1 wherein step b) is accomplished by a series of steps including computing a 2-d wavelet transform for each spectral band image of a spectral derivative of said datacube.

5. A method according to claim 4 wherein said series of steps further comprises:
   estimating a threshold value for each spectral band image
   performing a soft threshold wavelet shrinkage operation
   computing an inverse 2-D wavelet transform.

6. A method according to claim 5 wherein said inverse 2D wavelet transform comprises:

$$\tilde{\theta}(\lambda) = \text{IDWT2}\{\eta_{spatial}(\text{DWT2}\{\theta(\lambda)\})\}$$
$$\lambda=1,2,3,\ldots,N_b$$

wherein
   $\theta(\lambda)$ is a spectral derivative of a band image at band $\lambda$ of said datacube
   $\tilde{\theta}(\lambda)$ is a spatially denoised derivative spectral band image of said datacube DWT2 is a 2-D discrete wavelet transform applied to said spectral derivative of said band images at two spatial dimensions (along-track and across-track dimensions)

IDWT2 is an associated 2-D inverse discrete wavelet transform.

$\eta_{spatial}$ is a threshold function applied to said band image on a band-by-band basis for the entire said datacube.

7. A method according to claim 1 wherein step c) is accomplished by a series of steps including computing a 1-D wavelet transform for each spectrum corresponding to a spatial pixel at each location at a spatially denoised datacube resulting from step b).

8. A method according to claim 7 wherein said series of steps further comprises:
estimating a threshold value for each spectrum
performing a soft threshold wavelet shrinkage operation
computing an inverse 1-D wavelet transform.

9. A method according to claim 8 wherein said inverse 1-D wavelet transform comprises:

$$\hat{\theta}(p,l) = IDWT2\{\eta_{spatial}(DWT\{\tilde{\theta}(p,l)\})\}$$
$$p=1,2,\ldots,N_c;\ l=1,2,\ldots,N_r$$

wherein
$\tilde{\theta}(p,l)$ is a spectrum derivative of a spatially denoised datacube at spatial location (p,l)
$\hat{\theta}(p,l)$ is a spatially-spectrally denoised spectrum derivative of said datacube at location (p,l)
DWT is a 1-D discrete wavelet transform applied to a spectrum
IDWT is an associated 1-D inverse discrete wavelet transform
$\eta_{spectral}$ is a threshold function applied to said spectrum on a pixel-by-pixel basis for the entire said datacube.

10. A method according to claim 1 wherein said denoised data is converted into said original domain by spectral integration.

11. A method according to claim 10 wherein said spectral integration is accomplished by using a formula:

$$\hat{x}(\lambda_j, p, l) = \begin{cases} \hat{x}_1(p, l), & j = 1 \\ \hat{x}_1(p, l) + \sum_{i=1}^{j-1} \hat{\theta}(\lambda_i, p, l) \cdot \delta_\lambda, & j > 1 \end{cases}$$

wherein
$\lambda_i$ is a center wavelength of an $i^{th}$ spectral band
$\lambda_j$ is a center wavelengths of a $j^{th}$ spectral band
and $\hat{x}_1(p,l) = y(\lambda_1, p, l)$ represents said datacube in said original domain.

12. A method according to claim 9 wherein step e) is accomplished by cancelling error accumulated by step d) and by compensating a cancelled signal.

13. A method according to claim 12 wherein compensating said cancelled signal is accomplished by filtering.

14. A method according to claim 13 wherein at least two identical low pass filters are used to compensate said cancelled signal.

15. A method according to claim 14 wherein said low pass filters are moving average filters.

16. A method according to claim 15 wherein said filters replace low pass frequency components of a denoised signal from step d) with low frequency components of an original signal derived from said datacube such that $$\tilde{x}(\lambda_j, p, l) = \hat{x}(\lambda_j, p, l) - \frac{\sum_{i=j-\frac{\Delta}{2}}^{j+\frac{\Delta}{2}} \hat{x}(\lambda_i, p, l)}{\Delta} + \frac{\sum_{i=j-\frac{\Delta}{2}}^{j+\frac{\Delta}{2}} y(\lambda_i, p, l)}{\Delta} \quad (29)$$

wherein
$\Delta+1$ is a width of a correction window used by said filters
$\hat{x}(\lambda,p,l)$ is a denoised signal before correction
$\tilde{x}(\lambda,p,l)$ is a denoised signal after correction.

17. A system for increasing a signal to noise ratio of multidimensional data, said data being in an original domain, the system comprising:
means for elevating a noise level of said data
means for removing noise from said data in at least one domain to result in denoised data
means for converting denoised data into said original domain
means for correcting errors introduced to said data by a conversion of said denoised data.

18. A system according to claim 17 wherein said means for removing noise comprises:
means for removing noise from said data in a spatial domain.

19. A system according to claim 17 wherein said means for removing noise comprises:
means for removing noise from said data in a spectral domain.

20. A system according to claim 17 wherein said means for correcting errors comprises filters.

* * * * *

UNITED STATES PATENT AND TRADEMARK OFFICE
CERTIFICATE OF CORRECTION

PATENT NO. : 8,358,866 B2
APPLICATION NO. : 12/223283
DATED : January 22, 2013
INVENTOR(S) : Shen-En Qian and Hisam Othman It is certified that error appears in the above-identified patent and that said Letters Patent is hereby corrected as shown below:

In the Specification

Column 4, line 4, the word "reducing" should be replaced with --improving--.

Column 5, line 37, the word "whish" should be replaced with --which--.

Column 5, line 50, "Minimax Threshold" should not be indented.

Column 8, line 46, the ", 23" should be deleted from "[22, 23]".

Column 9, line 29, equation (14) should read:
$$\tilde{\theta} = IDWT2\{\eta_{spatial}(DWT2\{\theta\})\} \quad (14)$$

Column 9, line 32, equation (15) should read:
$$\hat{\theta} = IDWT\{\eta_{spectral}(DWT\{\tilde{\theta}\})\} \quad (15)$$

Column 10, lines 11-12 should read: --where $\sigma^2_{\varepsilon_{\hat{\theta}_i}}$ is the variance of $\varepsilon_{\hat{\theta}_i}(\lambda_i, p, l)$ and $\sigma^2_{\hat{\theta}_i \hat{\theta}_k}$ is the covariance of $\varepsilon_{\hat{\theta}_i}(\lambda_i, p, l)$ and $\varepsilon_{\hat{\theta}_k}(\lambda_k, p, l)$.--.

Column 10, line 23: equation (21) should read:
$$\sigma^2_{\varepsilon_i}(\lambda_j, p, l) = \left[(j-1)\sigma^2_{\varepsilon_{\hat{\theta}}} + (j-1)(j-2)\sigma^2_{\varepsilon_{\hat{\theta}}\varepsilon_{\hat{\theta}}}\right]\delta^2_\lambda \quad (21)$$

Signed and Sealed this
Twenty-seventh Day of August, 2013

Teresa Stanek Rea
*Acting Director of the United States Patent and Trademark Office*

CERTIFICATE OF CORRECTION (continued)

U.S. Pat. No. 8,358,866 B2

Column 21, line 20, in the equation in clam 9, "spatial" should be replaced with "spectral". The equation should read:

$$\hat{\theta}(p,l) = IDWT\{\eta_{spectral}(DWT\{\tilde{\theta}(p,l)\})\}$$
$$p = 1,2,\ldots,N_c; l = 1,2,\ldots,N_r$$

Column 21, line 26: the "$\tilde{\theta}$" at the beginning of line 26 should be replaced with --$\hat{\theta}$--. Line 26 should read:

$\hat{\theta}(p,l)$ is a spatially-spectrally denoised spectrum derivative